March 31, 1970  G. B. FOSTER ET AL  3,504,279
NONCONTACT INTERRUPTED SURFACE INSPECTION APPARATUS
PROVIDING AN ELECTRICAL ANALOG OF
THE SURFACE PROFILE
Filed Sept. 27, 1967  6 Sheets-Sheet 3
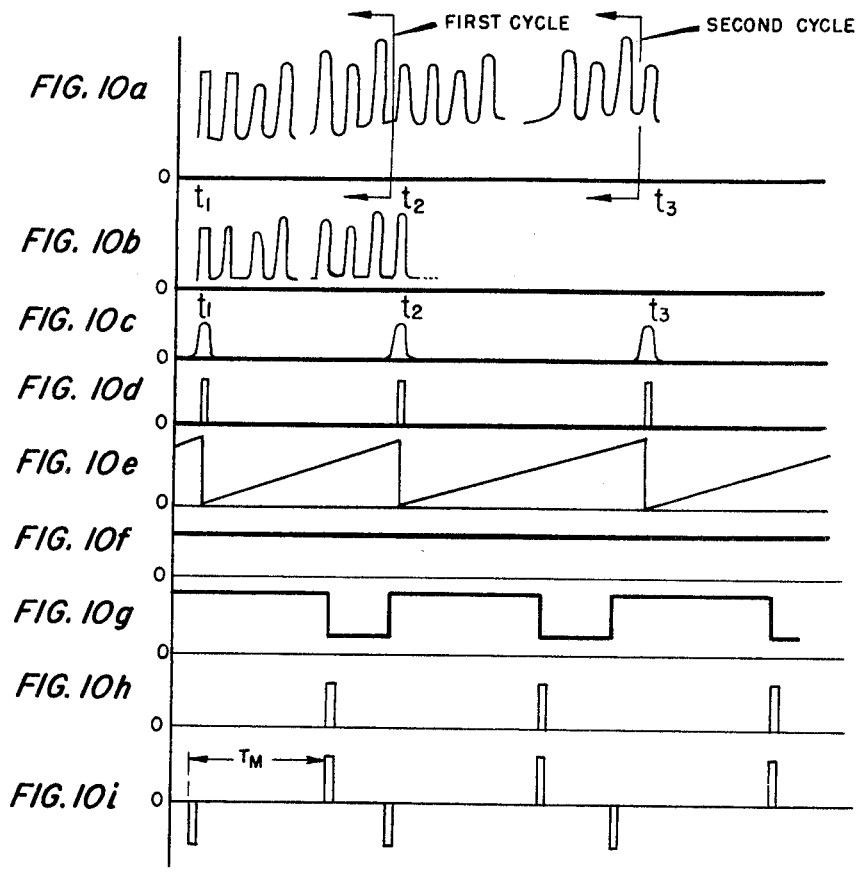
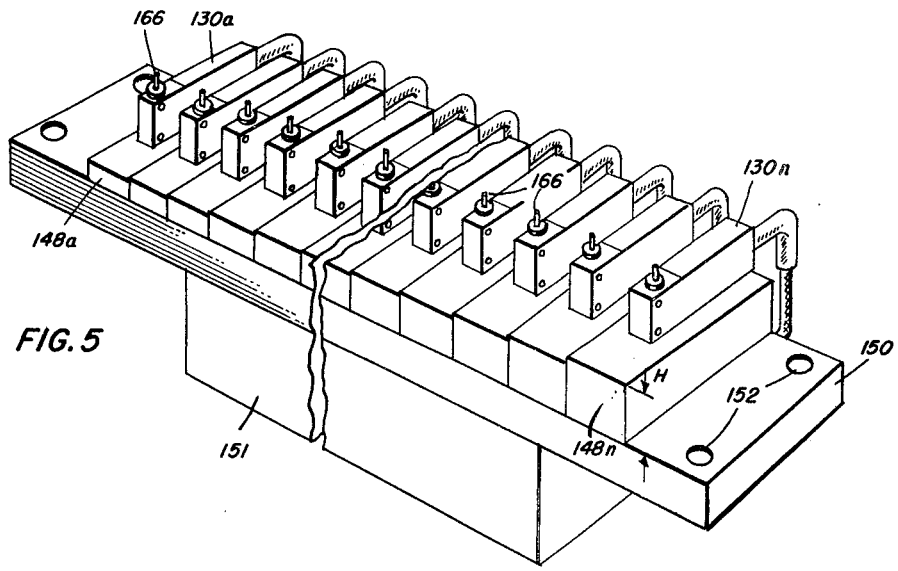

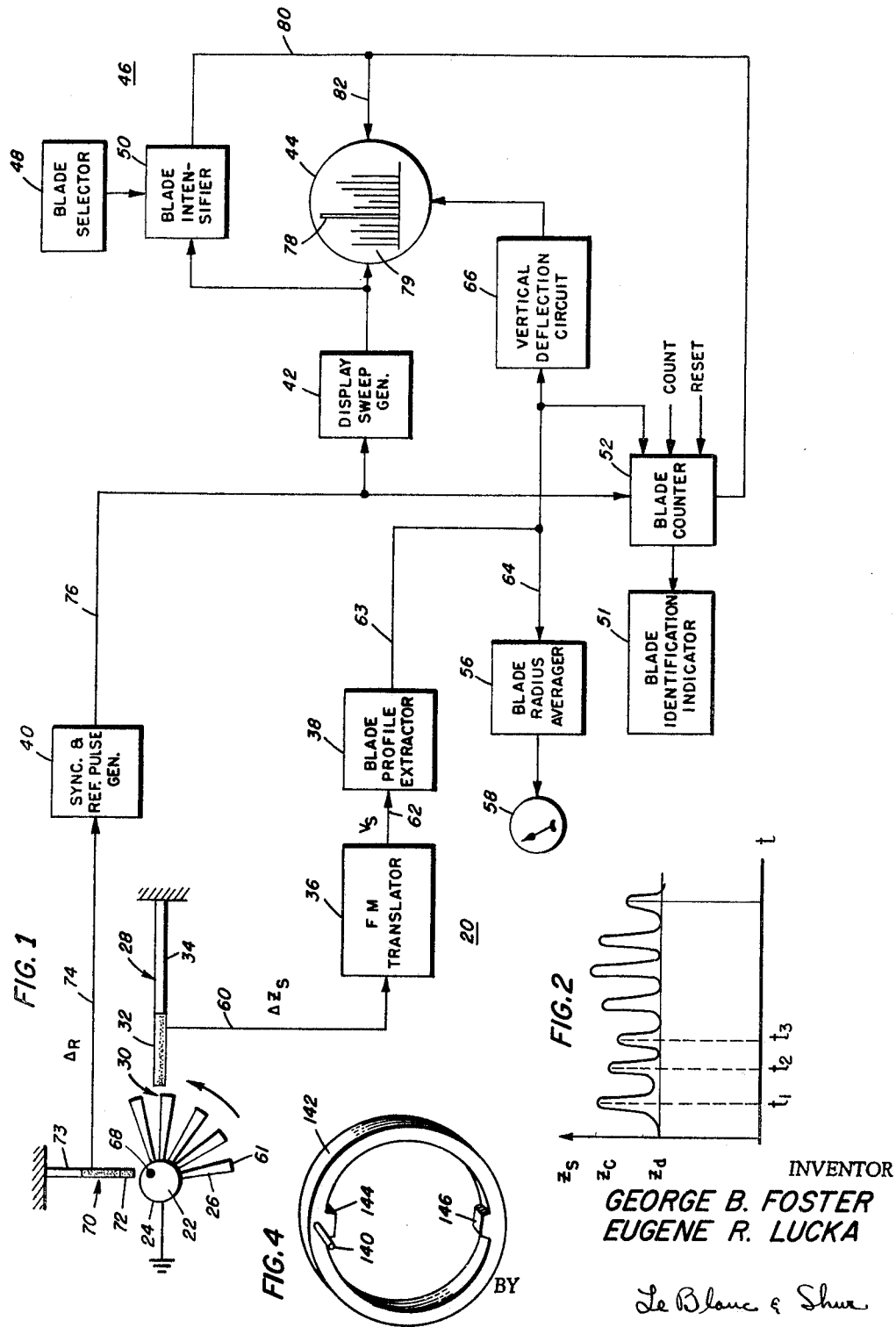

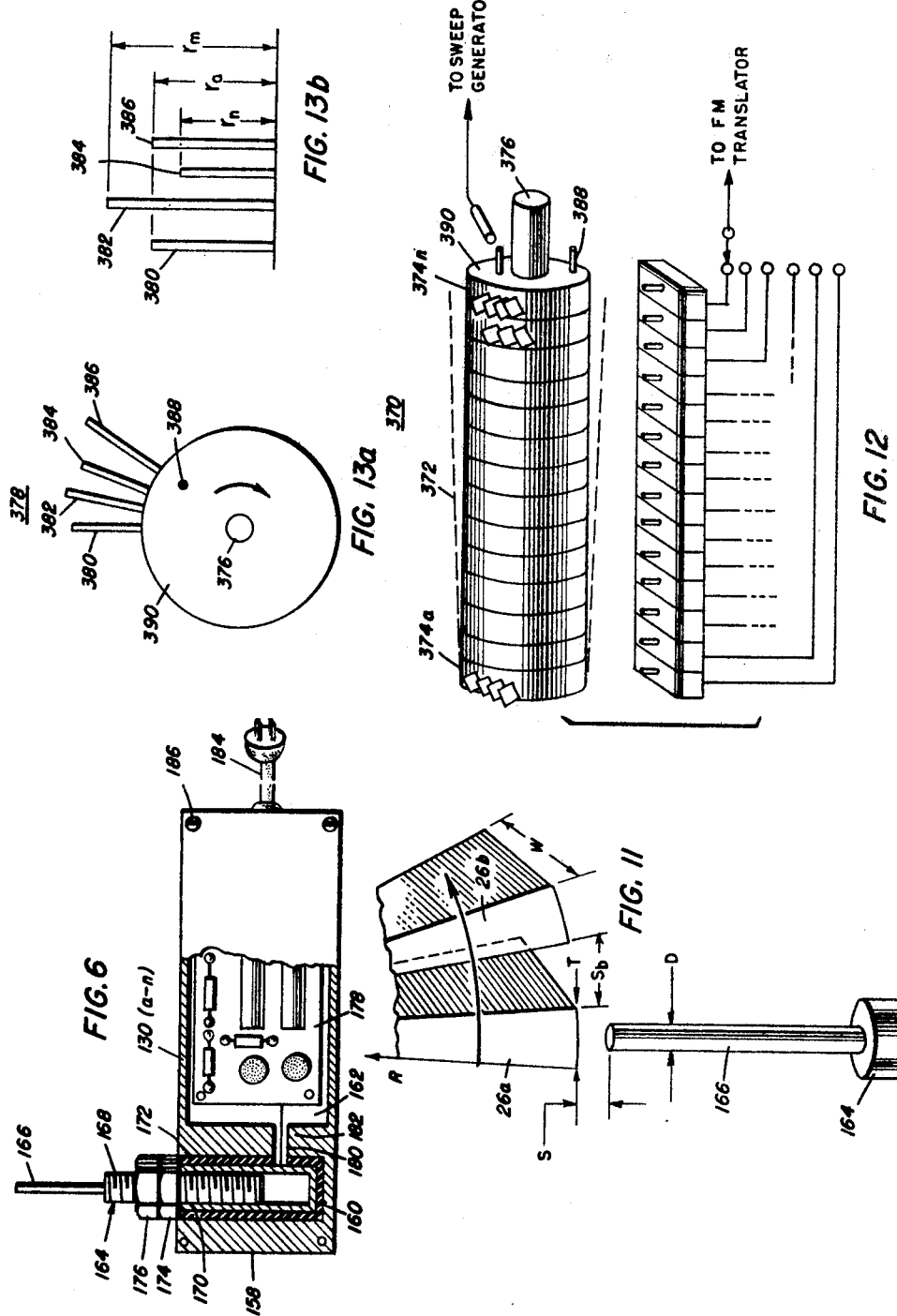

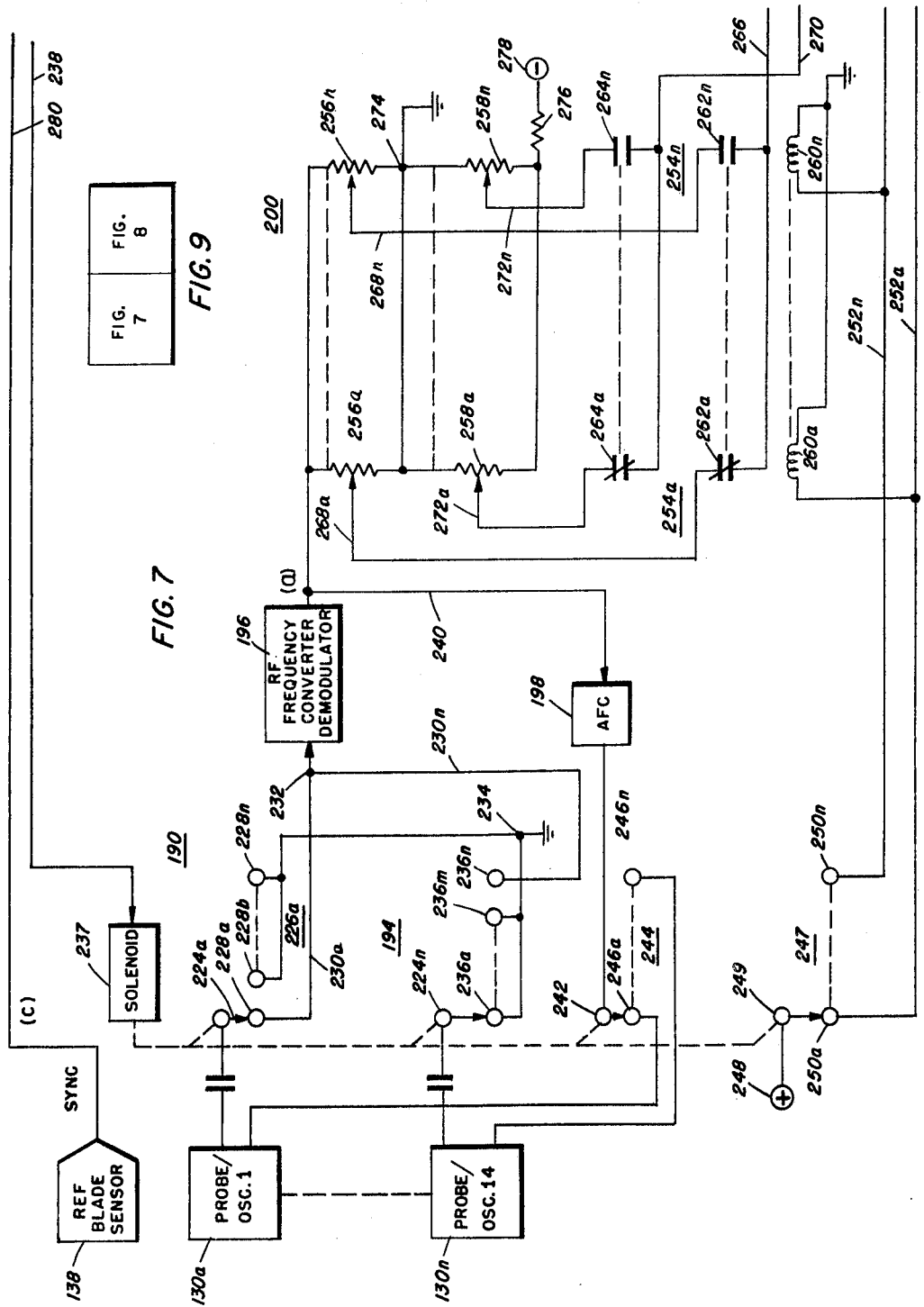

United States Patent Office 3,504,279
Patented Mar. 31, 1970

3,504,279
NONCONTACT INTERRUPTED SURFACE INSPECTION APPARATUS PROVIDING AN ELECTRICAL ANALOG OF THE SURFACE PROFILE
George B. Foster, Worthington, and Eugene R. Lucka, Columbus, Ohio, assignors to Reliance Electric and Engineering Co., Columbus, Ohio, a corporation of Ohio
Filed Sept. 27, 1967, Ser. No. 670,975
Int. Cl. G01r 27/26; G01m 1/16
U.S. Cl. 324—61
60 Claims

ABSTRACT OF THE DISCLOSURE

A system is described for the noncontact inspection of a rotating interrupted surface, including pickup sensitive to distance dependent energy variations, signal processing circuitry, and display means to provide a visual analog of the profile of the surface under inspection. System operation is based on a comparison of the object under inspection with a pre-established standard obtained by measurement of the properties of a production piece of known dimension or reference analog designed to accurately simulate the characteristics of the object under inspection. For inspection of a multiple stage rotor for a jet aircraft engine, an embodiment is shown including the above-described features and also permitting a stage-by-stage inspection and identification of any blade in the display profile by the employment of a cathode ray tube for display purposes, means for selectively intensifying the portion of the display corresponding to the desired blade and means for automatically counting the number of blades between a pre-established reference circumferential position blade and that corresponding to the intensified portion of the display.

---

The present invention relates to the noncontact inspection of interrupted surfaces, and more particularly to a method and associated apparatus for determining the surface profile of a rapidly rotating object of complex surface configuration. The invention finds particular utility in the inspection of turbine and compressor rotors for jet aircraft engines.

Investigations in the field of gas turbine technology and advances in the metallurgy of blading and case materials, better understanding and use of flame propagation and heat transfer theory, etc., have produced substantial improvements in engine reliability, specific fuel consumption, and thrust per pound of engine weight. However, optimum utilization of such technological advances also requires improved manufacturing techniques and narrower manufacturing tolerances. Advances in these areas assume even greater importance in applications requiring ultra high power jet engines, for example, in extremely large jet transports or in the proposed supersonic transport.

One of the most critical areas in the manufacture of jet aircraft engines is in the machining, assembly, and inspection of rotor blades for the turbine and compressor sections of the engine. Extremely tight blade radius tolerance is essential since greatly undersized blades result in excessive clearance between the rotor and the surrounding shroud, with consequential "blow-by" and reduced engine efficiency. On the other hand, a sufficiently oversized blade represents a considerable safety hazard due to the possibility of contact between the blade and the surrounding shroud.

Blade assemblies for jet engine rotors are constructed to permit convenient removal and replacement of individual blades. Thus, assuming the availability of sufficiently accurate inspection techniques, a rotor may be completely assembled and its surface profile examined to identify blades which depart greatly from the design radius. Such unsatisfactory blades may be replaced before installation of the rotor. Unfortunately, for the various reasons set forth below, heretofore available inspection techniques have been found to be insufficient for the critical measurements required in these areas.

Specifically, in the case of a rigid structure, e.g., a toothed wheel having peripheral surface interruptions fixed with respect to an axis of rotation, and where the dimensions to be measured are sufficiently large, conventional measuring techniques such as static measurement by means of contact devices or air gauging may be employed. Such techniques suffer from a number of disadvantages including substantial consumption of time and possibility of inaccuracy due to human error. Further, variations in the surface finish of the object being inspected may introduce inaccuracies for which compensation is not readily possible.

Contact gauging devices are also impractical for inspection of objects characterized by rapid profile variation or by small dimensions since accurate measurement would impose unrealistic demands on the mechanisms involved. For example, following the contour of a rotor with numerous long, narrow and closely spaced blades would be most difficult even for a static rotor. Obviously, following such contours under dynamic conditions would be impossible.

In such cases, optical shadow techniques have been employed. These are satisfactory under certain conditions but suffer from limitations of linearity, dynamic range of measurement and speed of response. The latter represents an especially serious difficulty when the object being inspected is rotating at high speed, or when large numbers of measurements must be rapidly obtained, for example, a typical jet engine rotor may include one hundred or more individual blades per stage.

Rotors for jet engines are not rigidly constructed, but rather are provided with so-called "loose seated" blade assemblies. In other words, the hub of each stage includes a pair of under cut peripheral grooves which define peripheral tracks for slidably retaining the individual blades. Stress relief requirements in the root of the blade retainer require several mils of looseness when the rotor is at rest. This looseness is overcome and the blades are seated in operative position by the centrifugal force acting on the individual blades when the turbine or compressor is rotating. Thus, accurate inspection of the rotor profile can only be achieved under dynamic conditions, i.e., with a sufficiently high r.p.m. to assure complete seating of the blades in their maximum radial position. Typically, this does not result for rotor speeds of less than about 1,000 r.p.m. Thus, for a structure having 60 blades and rotating at a minimum speed of 1,000 r.p.m., accurate inspection of the rotating profile would require a measurement capability of at least 1000 inspections per second. Again, contact measurement under such conditions is not feasible.

Adaptations of the various optical techniques referred to above have been suggested, but the low response speed of such arrangements precludes inspection of rapidly rotating structures and requires measurement on a blade-by-blade basis. One such technique involves applying a radial magnetic force to the rotor, one blade at a time, to extend each blade to its seated position. The arrangement includes a light source and an aligned photocell so positioned that the amount of light reaching the cell depends on the radius of the individual blade being inspected. Thus, the radius of each blade can be determined and the composite rotor stage profile established. However, in addition to the inherent difficulties in the optical measuring techniques indicated above, the individual rotor blades must be capable of magnetization for such an arrangement to be used. This is frequently not the case with materials employed in blades for modern high speed turbines and compressors. In short, no heretofore available system has been capable of meeting the concurrent demands of high accuracy and rapid measurement necessary to optimize the efficiency of modern jet aircraft engines.

In addition to the limitations of feasibility, accuracy, and convenience of the inspection techniques set forth above, it has been found that the conventional techniques of information display are inadequate for the high speed, high accuracy measurements here involved. For example, it has been found to be desirable to provide a visual display of the profile of an entire rotor stage and to present such information with sufficient accuracy and clarity to permit rapid visual comparison of all blades and identification of substandard blades. Accuracy as high as ±200 microinches (0.2 mil) may be essential under certain circumstances.

Moreover, it will be understood that measurement under dynamic conditions results in surface profile data including individual blade tip radius date and a rotor radius runout component. These components combine to produce a surface profile including absolute blade radius information and also runout information, i.e., cyclic variation of the radius of the blade tip circle due to departure from a perfect circular path of the rotor drum itself. A successful inspection system should include means for separating these two information components and for individually presenting them in visual form for the system operator. In addition to the visual display, the system should be capable of providing output information in a form usable by other automatic equipment and adaptable for computer processing, for example, to provide automated assessment and correction of manufacturing tolerance.

These requirements have resulted in numerous unsuccessful attempts to refine and adapt conventional techniques to the dynamic measurement of rapidly rotating interrupted surfaces as outlined above. In contrast, the present invention stems from recognition of the need for a new approach and novel techniques by which accurate dimensional standards may be set and deviations easily detected and precisely measured. In addition to advanced measuring techniques, the inspection system of this invention is adapted to provide improved and automated data processing and display capability.

The present inspection technique and system combines and correlates advances in noncontact dimension measurement with improved concepts of reference establishment, information processing and electronic display techniques. According to the present invention, invariable calibration standards are established by the use of a production piece of known dimensions or a reference analog designed to simulate accurately the essential properties of the mechanical system to be inspected, yet simple in construction and use, and not subject to variation of dimensions or other characteristics. The inspection system operates to compare the reference analog with the actual workpiece, thereby employing easily established accurate and substantially invariable calibration.

As will be understood, the exact construction of the production piece reference analog will depend on the nature of the interrupted surface being inspected. For inspection of a jet aircraft engine turgine or compressor rotor, the reference analog comprises a rotor drum and a sufficient number of rigidly attached blades to simulate all of the salient features of the production rotor.

The inspection system itself includes a noncontacting transducer system having pickup means of advanced design responsive to energy variations in the space between the pickup and the object being inspected. Pickup means useful in accordance with the principles of this invention may be responsive to accoustic energy, electrical energy, magnetic energy, or electromagnetic energy of all frequencies—in short, any energy manifestations which may be made to vary in a measurable way as a function of the relative spacing between a pair of closely spaced but noncontacting bodies. Thus, the pickup means may provide an electrical impedance which varies as a function of the rotor blade to pickup spacing or variable reluctance or other position sensitive magnetic effects, or any other spatially sensitive energy variation.

This system further includes a selectively operable multichannel information carrier system and information processing and conversion means for identifying and separating information signals representative of the various dimensions of the rotor being inspected. Included also are synchronizing means to permit location and identification of information pertaining to an individual blade in a blade assembly and readout means to present the results of the rotor inspection in an unambiguous, convenient, and accurate visual format, and simultaneously in a format suitable for computer storage and automatic processing.

Accordingly, it is a principal object of this invention to provide a method for high speed, noncontact inspection of a rotating interrupted surface.

It is a further object of this invention to provide a method for noncontact inspection of a rotating interrupted surface in which extreme accuracy is achieved by comparison of the surface being inspected with a substantially invariant workpiece surface analog.

It is a related object of this invention to provide a noncontact method of inspection of a turbine or compressor rotor for a jet aircraft engine having a nonrigid blade assembly in which inspection is made under dynamic conditions.

It is a further general object of this invention to provide an improved inspection system for a rotating interdupted surface.

It is a related object of this invention to provide a noncontacting inspection system for a loose seated rotor blade assembly or the like capable of extremely rapid and accurate measurement.

It is also an object of this invention to provide a noncontacting inspection system for a rotor blade assembly which provides a visual display of the surface profile of the entire rotor stage and also provides means for conveniently obtaining dimension and blade identification information separately for each blade.

It is a further object of this invention to provide a noncontacting inspection system as described above including pickup means responsive to energy variation in the space between the pickup means and the object being inspected.

It is also an object of this invention to provide a noncontacting inspection system as described above further including means for selectively inspecting a plurality of stages in a multistage rotor assembly.

It is a further object of this invention to provide a substantially invariant calibration standard for use in accordance with the method and system of this invention.

It is a related object of this invention to provide a calibration standard representing the rotor drum and a sufficient number of blades to simulate all the salient structural features of the production rotor The exact nature of this invention as well as other objects and advantages thereof will become apparent from consideration of the following detailed specification and the accompanying drawings in which:

FIGURE 1 is a generalized schematic diagram showing the basic features of the noncontacting inspection system according to this invention;

FIGURE 2 is a waveform diagram showing the output of the noncontact pickup of FIGURE 1;

FIGURE 4 is an enlarged view showing the construction of a synchronizing and reference marker ring used with the inspection system of FIGURE 3;

FIGURE 5 is an enlarged view showing the details of the transducer assembly of FIGURE 3 for a typical 14-stage jet engine rotor;

FIGURE 6 is a side elevation, partially in section and partially broken away showing details of the construction of a single noncontacting pickup;

Figure 8:
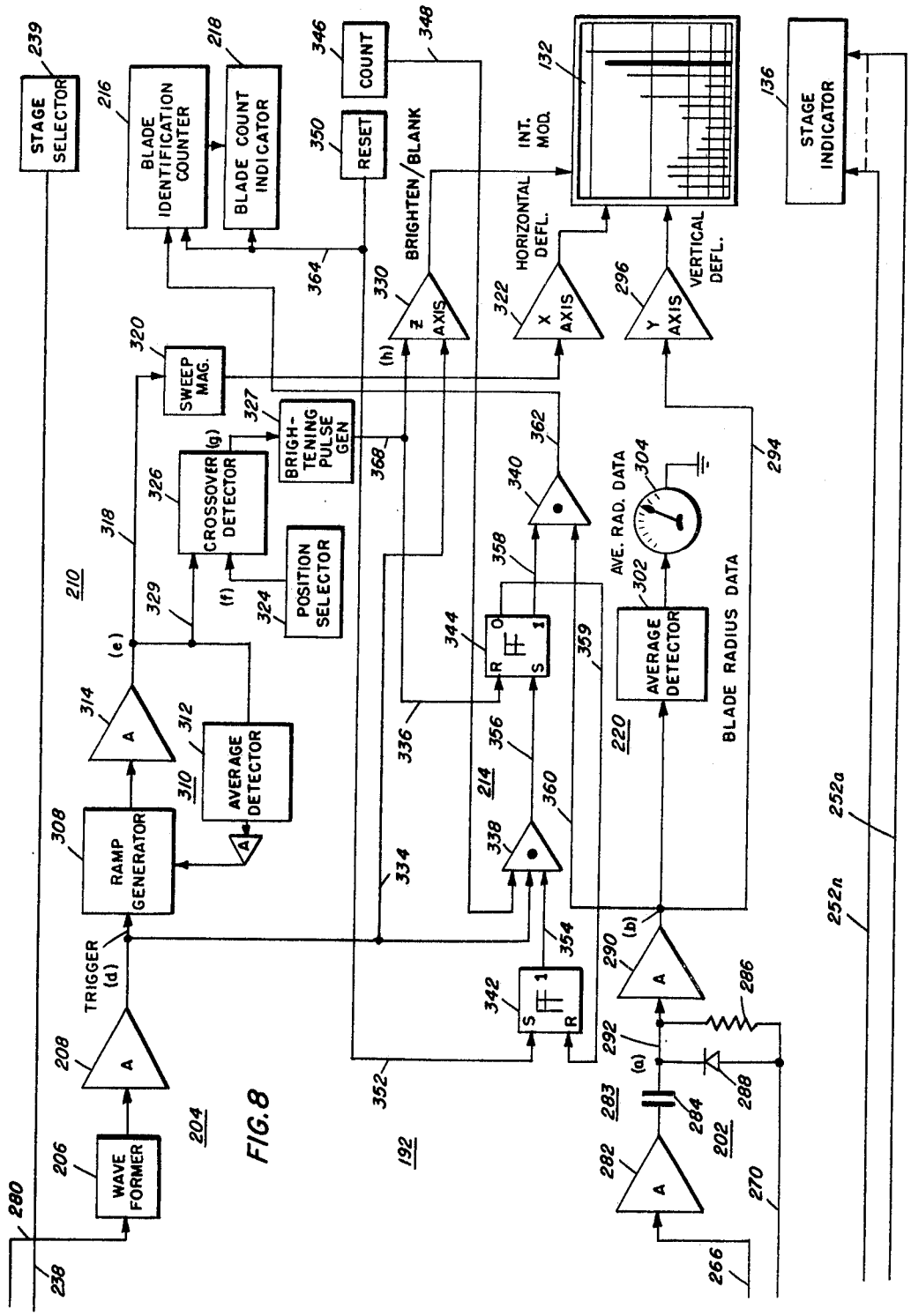

FIGURES 7 and 8, arranged as shown in FIGURE 9, show a detailed electrical block diagram including the principal components of a practical embodiment of the electronic system according to this invention;

FIGURE 10 is a waveform diagram to assist in the explanation of the operation of the electronic system of FIGURES 7 and 8;

FIGURE 11 is an enlarged view of a portion of a noncontacting pickup and a single rotor blade showing certain dimensions and relationships found to be of important significance in establishing proper operating conditions for the inspection system of this invention;

FIGURE 12 is a diagram of a production piece reference analog for use in accordance with this invention; and FIGURES 13a and 13b show a detailed view of the production piece reference analog of FIGURE 12.

Referring now to FIGURE 1, there is shown at 20, a generalized schematic diagram of an interrupted surface inspection system in accordance with the present invention. As shown, the system is intended for inspection of a rotating, multiple-bladed object 22 such as a jet aircraft engine rotor as described above. Rotor 22 comprises a drum 24 of generally circular cross section for support in a series of rotor blades 26. During inspection, suitable means (not shown) is provided for driving rotor 22 in the direction shown so that each blade 26 passes successively in close proximity to a noncontacting pickup means 28. As previously mentioned, pickup 28 is so constructed to cooperate with rotor 22 to provide a sensor for energy variations occurring in the space 30 between the pickup and the rotor. The details of the construction of pickup 28 are set forth below in connection with FIGURE 6, but for present purposes it may be assumed to be adapted to respond to variations in electric energy stored in region 30. Accordingly, if rotor 22 is electrically grounded while at least the tip portion 32 of probe 28 is electrically isolated from ground (as by an insulating portion 34), then an electrical potential can be established between rotor 22 and probe tip 32. If the potential is time varying, and if the probe-to-rotor spacing is sufficiently small, a time varying current may exist in region 30, the intensity of which is found to be a relatively complex function of the composition and geometry of probe tip 32 and rotor 22 and of the probe tip-to-rotor spacing. For present purposes, however, such current may be regarded as characterized by a relationship in the form of:

$$I(t) = C \frac{dV(t)}{dt} \qquad (1)$$

where $I(t)$ = instantaneous value of the current, where $V(t)$ is the instantaneous value of the applied electric potential, and where C is inversely related some function of the spacing between probe tip 32 and rotor 22. This relationship is a sufficient characterization of the electrical properties of pickup 28 as long as the time rate of change of $V(t)$, i.e., the excitation frequency, is sufficiently low that the wave length corresponding to that frequency is substantially larger than the probe tip-to-rotor spacing. Thus, the pickup rotor combination is equivalent to a nonlinear capacitor, the value of which varies with the distance from the probe tip to the rotor. As explained below, for proper probe tip geometry, an accurate representation of the profile of rotor 22 can be obtained as the blades 26 pass in succession in front of pickup 28.

The electronic portion of FIGURE 1 shows only those features essential for an understanding of the concepts of this invention. Included are an FM translator 36, a blade profile extractor circuit 38, a synchronization and reference pulse generator 40, a display sweep generator 42, a cathode ray display device 44, and an intensity modulating circuit 46 including a blade selector 48, and a blade intensifier signal generator 50.

Also included is a blade counter 52, a blade identification display device 54, and, if desired, a blade radius averager 56 and an associated display device such as meter 58.

The capacitance variation $\Delta Z_s$ at the output of pickup 28 is a pulsating representation of the instantaneous effective distance between rotor 22 and probe tip 32. A typical $\Delta Z_s$ waveform is shown in FIGURE 2. For a sufficiently directional pickup, the $Z_s$ signal on lead 60 is at a high level when the crown 61 of a blade 26 passes in close proximity to probe tip 32 and falls to a low value between blades. The height of each pulse varies in accordance with the blade crown-to-probe tip distance for that particular blade, while the level of the signal between the pulses is determined by the instantaneous distance from the probe tip to the rotor drum surface.

For a perfectly machined rotor drum and blade assembly, both the blade crown and rotor drum profiles will be constant. Thus the capacitance signal $Z_s$ would oscillate between two constant levels such as indicated by the lines $Z_c$ and $Z_d$ in FIGURE 2.

In reality, however, variations in both the blade crown profile and the rotor drum profile are unavoidable. Thus inspection of a typical production rotor will result in a $Z_s$ waveform characterized by variation both in the blade radius (pulse height) and in the drum radius components (interpulse height) as shown.

Since rotor assembly 22 is in continuous rotation $Z_s$ is periodic and includes components at both the primary rotation frequency of the rotor and also at the surface interruption frequency. For a rotor having $n$ blades, and turning at a fixed r.p.m., the entire pulse ensemble (only part of which is shown in FIGURE 2) will be repeated at a frequency $$f_R = \frac{\text{r.p.m.}}{60}$$

i.e., with individual pulsations appearing at times, $t_1$, $t_2$, etc., such that $$t_1 = t_2 = t_3 = \frac{1}{f_P} = \frac{60}{N \times \text{r.p.m.}}$$

In the case of the capacitive probe 28 shown in FIGURE 1, the waveform $Z_s$ represents an impedance variation between lead 60 and ground, although it will be understood that for noncontacting energy sensitive probes of other types, the signal $Z_s$ may represent a time varying current, reluctance, etc.

Referring again to FIGURE 1, the variable impedance of probe 28 is connected by lead 60 as an input to FM translator 36. The latter includes a frequency modulated oscillator, the output frequency of which depends on the input impedance appearing on lead 60, and appropriate FM demodulating and automatic frequency control circuitry for the oscillator whereby the variable impedance $Z_s$ is converted into a corresponding voltage variation $V_s$. As in the case of the impedance $Z_s$, the voltage $V_s$ on lead 62 includes information components having fundamental frequencies $f_R$ and $f_P$ representing the drum and blade circle profiles.

The signal on lead 62 is connected to blade profile extractor circuit 38 which operates to remove the superimposed rotor drum surface profile component and to establish a fixed base line against which the absolute blade radius profile can be measured. The output $V_{s'}$ of the blade profile extractor circuit 38 is connected over leads 63 and 64 to vertical deflection circuit 66 of conventional construction, and thence to the deflection means of cathode ray display device 44. In addition, it may be desirable to obtain an average measure of the blade radius profile, as well as a visual representation of individual blade height. Thus, a blade radius averager circuit 56 and a display device such as meter 58 are included. Averager 56 is preferably constructed to provide a time average of the total blade height over several revolutions of rotor 22. In practice an average over 10 revolutions gives satisfactory results.

The horizontal time base for display device 44 is provided by synchronization and reference pulse generator 40 and display sweep generator circuit 42. In order to provide a static display of the profile of rotor 22, it is necessary to maintain precise frequency and phase synchronism between the rotor and the horizontal sweep for display device 44. This is best achieved by providing a reference position marker 68 secured in some convenient fashion to rotor drum 24. For example, marker 68 may comprise an elongated axial pin mounted on a ring or disc, and secured to the end of rotor drum 24. A noncontacting proximity sensor 70 is mounted in any convenient fashion so that marker pin 68 passes close to pickup 70 once for each revolution of rotor 22. For a pickup 70 similar to the noncontacting capacitive pickup 28 described above (comprised of a conducting tip portion 72 isolated from ground by a suitable insulating material 73), there will be produced an impedance variation $Z_r$ comprising a single pulse having a repetition rate equal to the speed of rotation, and occurring in fixed phase relationship to one particular rotor blade 26.

The signal $Z_r$ is provided over lead 74 to synchronization and reference pulse generating circuit 40 which includes suitable amplifying and wave shaping means to generate a trigger pulse of proper amplitude, duration, and phase for utilization by the remainder of the system. The trigger pulse actuates display sweep generator circuit 42 to provide a triggered saw tooth sweep signal for the horizontal deflection means of display unit 44. Sweep generator 42 also includes a constant amplitude feedback control means whereby the slope of the sweep saw tooth remains constant. This is necessary so that a complete horizontal trace is produced for each revolution of rotor 22, independent of the rotor speed. If the saw tooth slope is too small, a complete rotor revolution will occupy less than the entire available display area with possible loss of visual resolution. On the other hand, an excessive slope will result in completion of the horizontal trace in less than one revolution of the rotor with consequential failure to display the entire blade radius profile. For proper adjustment of sweep generator 42, a sweep covers exactly one revolution of rotor 22. Thus, the pattern appearing on display device 44 will remain static as the rotor spins and will include optimally spaced pulses corresponding to each rotor blade.

A further feature of the present inspection system is the means by which the attention of the operator may be focused on the pulse for a single blade in the display, and by which such a blade may be unambiguously identified in the rotor structure itself. The desirability of this feature may be understood from the following: Suppose that one of blades 26, i.e., that designated 78 on display 44, appears to be so greatly oversized that replacement is necessary. Since reference marker 68 is fixed physically relative to a given blade, i.e., that corresponding to the first pulse 79 on display 44, it would be possible to count manually the pulses between pulses 79 and 78, and then to repeat the count on the rotor itself. However, rotor 22 may include 100 or more blades with corresponding pulses closely spaced in display 44. Thus, direct counting of pulses is a potential source of inaccuracy, or, at least a tedious and time consuming operation.

Again, reference marker 68 is fixed with respect to a given rotor blade. Thus, there can be provided means for automatically counting the number of blades from the beginning of the sweep to any given blade in the display. This function is provided by blade selector 48, intensifier signal generator 50, blade counter 52, and blade identification display 54.

Blade selector 48 comprises a manually adjustable reference voltage signal. This is connected to blade intensifier 50, which includes circuitry for comparing the reference voltage with the sweep generator output voltage to produce a narrow pulse output signal on lead 80 at any desired point in the horizontal sweep saw tooth. This signal is connected by lead 82 to an acceleration grid in display device 44, and produces a distinctly visible increase in display intensity in a narrow portion of the sweep (corresponding to the duration of the pulse). The desired location of the brightened portion of the display is determined visually, i.e., blade selector 48 is adjusted until the intensified portion of the sweep coincides with pulse 78, or that corresponding to any other blade, the identity of which is of interest. Automatic blade counter 52 is employed to count the number of pulses between pulse 79 and the brightened portion of the display. Blade counter 52 comprises a suitable digital counter and associated logic circuitry of conventional design, as well as manual start and reset means to initiate a count and to reset the associated display 54 (which may comprise a series of Nixie tubes or the like). Blade counter 52 is conditioned by the trigger signal on lead 76 and, if triggered by a manual count command, operates to count the $V_s$, blade pulses on lead 84 and to display the running count on indicator 54.

Operation of counter 52 is inhibited by the brightening pulse on lead 80 so that counting stops and the total is retained pending an external reset command. Following a positioning of the display brightening pulse, a count can be initiated, and blade pulses are counted from the arrival of the trigger signal (signifying the beginning of a revolution of rotor 22), until the appearance of the brightening signal on lead 80, at which time the counter 52 is stopped and maintains the total count up to that point.

Thus, by adjusting blade selector 48 until the brightened portion of the display is positioned over the pulse for a particular blade to be identified, the blade location relative to reference marker 68 can be ascertained quickly and accurately to permit later blade replacement.

Figure 3:
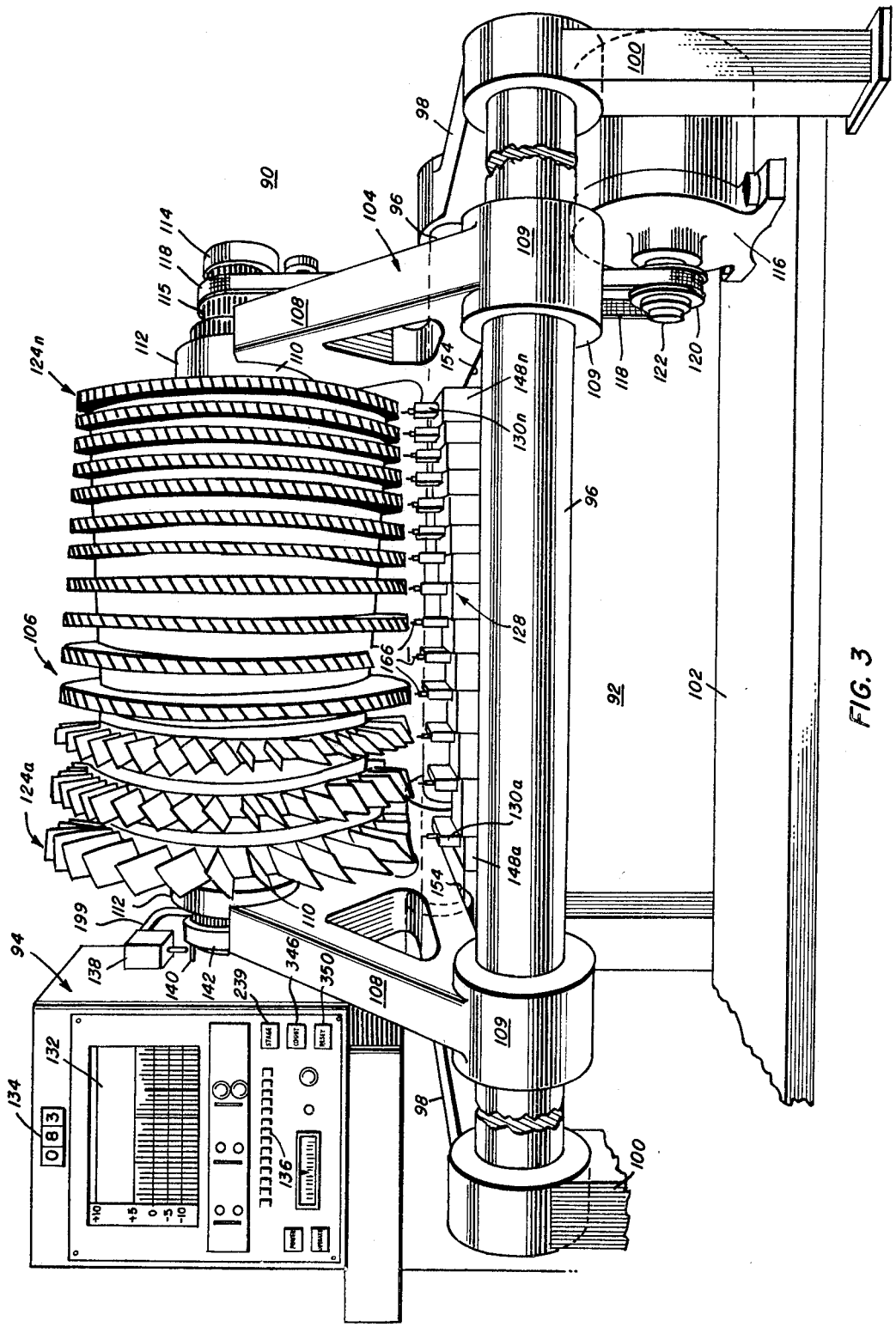
FIGURE 3 is an overall, perspective view of a practical embodiment of an inspection system designed according to the principles set forth in connection with FIGURE 1.

In FIGURE 3, there is shown a practical embodiment of the inspection system described in connection with FIGURE 1. The system, generally denoted at 90, comprises a test stand 92 and an electronic console 94. Test stand 92 is comprised of a pair of horizontal side rails 96 and end rails 98, four legs 100 and a bottom plate 102. Mounted in any conventiont fashion on horizontal side members 96 is a rotor cradle 104 upon which a rotor 106 or other workpiece to be inspected is mounted. Cradle 104 includes a pair of upright bridges 108 each adjustably positioned on side rails 96 by a pair of cylindrical collars 109 to provide proper separation for the object under inspection. Each of bridges 108 also includes a generally semicircular depression 110 for supporting the end bearings 112 in which the rotor shaft 114 spins when the rotor is in use.

For test purposes, an electric motor 116 secured to test stand lower platform 102 drives rotor shaft 114, for example, through a flexible belt 118 passing over rotor shaft 114 and over a suitable pulley 120 secured on a motor output shaft 122. A protective shroud (not shown) for rotor 106 may be provided if desired in the interest of operator safety.

As previously mentioned, a typical jet engine rotor such as 106 is a multistage structure including, for example, 14 stages 124a–124n, each comprising a series of loosely fitting blades positioned on a circumferential track on the drum of each rotor stage. As shown in FIGURE 3, the individual rotor stages are of varying size, whereby the rotor is a generally conical structure having numerous blades of varying size and spacing. Under these circumstances, it has been found to be desirable to provide a separate inspection pickup or probe for each individual rotor stage.

Thus, in FIGURE 3, a transducer assembly 128 is suspended from the underside of rotor cradle bridges 108 with a plurality of individual pickups 130a–130n, each in close proximity to, but not in contact with, one of rotor stages 124a–124n. Each of probes 130a–130n may be selectively actuated to provide an electrical signal analog of the blade radius profile for the associated rotor stage. As explained below, a portion of the system electronics is preferably contained in transducer assembly 128 to minimize noise pickup, while the remainder is contained in electrical console 94 positioned in any convenient location.

Console 94 includes electronic information processing and display equipment for converting an electrical blade profile analog into a useful visual display. Console 94 includes a cathode ray tube display 132, a blade identification indicator 134, a stage identification display 136, and various meters, manual adjustment knobs, and selector switches to actuate the various display functions, as described below.

Cathode ray tube 132 and associated circuitry are of customary design including horizontal (X) and vertical (Y) deflection means, intensity (Z) modulation, and means for external control of the horizontal deflection circuitry, as explained below. Blade identification indicator 134 serves as explained in connection with FIGURE 1, to display a numerical identification of a selectively intensified blade pulse on the CRT display 132. As mentioned, indicator 134 may comprise a series of Nixie tubes, or equivalent display means.

Since the rotor 106 includes 14 separate stages, each inspected separately, illuminated indicators 136 are provided on console 94 to identify the particular stage under inspection. Suitable selector means, e.g., a stepping switch (not shown), is provided to successively actuate one of pickups 130a–130n to provide inspection of each of rotor stages 124a–124n.

As explained with reference to FIGURE 1 above, a reference position marker is preferably included to establish external synchronization of the horizontal sweep for cathode ray display tube 132 and also to serve as a fixed reference point from which to establish a blade count. Thus, a proximity sensor 138 is provided, secured, as by an arm 139, to one of rotor cradle bridges 108, for example, that shown on the left in FIGURE 3. Proximity sensor 138 is positioned to cooperate, as previously explained, with a reference marker pin 140, extending axially from a supporting ring 142 secured to the end of rotor shaft 114.

As shown in detail in FIGURE 4, ring 142 is an annular member having an internal diameter slightly exceeding that of rotor shaft 114. For the rotor 106 shown in FIGURE 3, shaft 114 includes a plurality of axial slots 115, normally employed for mounting the rotor in the assembled engine. These slots are conveniently employed in the present instance for affixing ring 142 to the rotor. Thus, ring 142 is provided with a pair of diametrically positioned keys 144 and 146, machined to fit into a pair of the slots 115 in the rotor shaft. Of course, in the absence of a slotted surface on rotor shaft 114, any other convenient means of attaching ring 142 may be employed.

As may be understood, marker pin 140 is so positioned relative to keys 144 and 146, that it is accurately aligned with a single rotor blade per stage (i.e., an axial rank of blades on the 14 stages) when ring 142 is attached to the rotor. This assures an unambiguous association of a given blade with the first pulse in the blade profile display, and permits automatic blade identification as described above.

Referring next to FIGURE 5, there is shown the construction of transducer assembly 128. A plurality of noncontacting pickups 130a–130n are positioned on separate supporting blocks 148–148n, each of which is in turn secured to an elongated rectangular base plate 150. Each of supporting blocks 148a–148n is of a different thickness selected to provide a coarse adjustment of the spacing between the individual pickups and the corresponding rotor stages.

Also secured to rectangular base plate 150 is a hollow receptacle 151 in which is mounted that portion of the system electronics which is preferably located in close proximity to the individual pickups 130a–130n. Base plate 150 and the components described above attached, is secured to rotor cradle 104 in any convenient fashion, for example, by means of a plurality of mounting bolts extending through a series of mounting holes 152 in base plate 150 and into complementary threaded apertures (not shown) in the under surfaces 154 of rotor cradle bridges 108 (see FIGURE 3). If the previously mentioned protective shroud is employed, an access slot is provided in alignment with pickups 130a–130n through which rotor 106 is inspected.

Shown in FIGURE 6 is one of the noncontacting pickups 130a–130n preferably used in the inspection system shown in FIGURE 3. The pickup comprises a metal casing 158 having a pair of cavities 160 and 162 containing portions of the pickup described below. The actual sensing means is a probe 164 including an elongated electrically conducting needle element 166 and an externally threaded supporting shank 168. Threaded shank 168 is received by a complementary internally threaded conducting insert 170 positioned within cavity 160 in pickup casing 158. As discussed in connection with FIGURE 1, the sensitive portion of pickup 130 (corresponding to the tip 32 of probe 28), is preferably insulated from ground to permit the establishment of a potential difference with respect to the grounded rotor. In the embodiment shown in FIGURE 6, this is achieved by means of an additional insulating insert 172 positioned in cavity 160 between conducting insert 170 and the body of casing 158. An insulating spacer 174 and an internally threaded locking nut 176 is positioned as shown, whereby probe 164 may be adjustably positioned within threaded insert 170, and locked in place by tightening nut 176. This permits a fine adjustment of the distance between the probe needle 166 and the associated stage of the rotor under inspection.

Positioned in cavity 162 is an electronic circuit board 178 upon which is assembled a variable radio frequency oscillator. The variable capacitance established between probe needle 166 and the associated rotor stage is coupled into the frequency determined circuit for the oscillator by means of an insulated wire 180 soldered or otherwise secured to conducting insert 170 and extending through a passage 182 between cavities 160 and 162. The frequency modulated RF output of the oscillator on circuit board 178 is connected to the remainder of the inspection system by means of a coaxial cable 184 of suitable impedance passing through an aperture in the rear wall 186 of pickup casing 158.

From the foregoing, it will be understood that each of the pickups 130a–130n is provided with a separate variable frequency oscillator housed within the probe casing itself in as close proximity as is practical to the sensing element 164. Such construction is preferred since the capacitance between the rotor and probe needle is extremely small. Detection of such small capacitance against the background of random stray capacitance and cable capacitance which would result from attempted connection of probe 164 to its associated oscillator over a cable of even moderate length, would be quite difficult. For similar reasons, it is preferable that connecting cable 184 carrying radio frequency signals be as short as possible. This is accomplished by including the entire radio frequency portion of the inspection system electronics within transducer assembly 128, for example within receptacle 151 attached to base plate 150. Thus, a simple multiconductor cable may be employed to connect transducer assembly 128 to electronic console 94 (see FIGURE 3) and all signals appearing thereon are of relatively low frequency. This permits the use of low frequency wiring within the connecting cable and greatly reduces the possibility of signal degradation due to random noise pickup.

A detailed block diagram showing the significant features of the electronics for the inspection system of FIGURE 3 is shown in FIGURES 7 and 8, arranged as indicated in FIGURE 9. As previously mentioned, the electronic portions of the system is preferably divided into two subsystems to minimize noise pickup at high frequencies. Thus, a first subsystem 190 shown in FIGURE 7 and blade profile extractor 202 shown in FIGURE 8 is contained entirely within transducer assembly 128, and a second portion 192 shown in FIGURE 8 is contained within electronics console 94.

Included in subsystem 190 are pickups 130a–130n and reference marker sensor 138, a multiple level stepping switch 194, an FM demodulator 196 for the pickup oscillators, an automatic frequency control feedback loop 198, and individual base line and sensitivity setting circuits 200 for each of pickups 130a–130n.

Included in electronic subsystem 192 (FIGURE 8) are a trigger signal generator 204, constant amplitude sweep signal generating circuitry 210, a blade intensifier signal generating circuit 212, blade identification counter logic 214, and a blade identification counter 216, and associated blade count indicator 218. Also included in subsystem 192 are cathode ray tube (CRT) display 132 and associated control circuitry, an array of 14 rotor stage identification indicators 136, blade radius averaging circuitry 220 and various potentiometers and switches identified below, for controlling the operation of the inspection system. As previously mentioned, the interconnections between profile extractor 202 and subsystem 192, carry only signals of low frequency (for example, audio frequency) whereby noise pickup in the interconnecting cables is minimized.

In the following detailed description, frequent reference should be made to FIGURE 10 of the drawing, the various lines of which represent typical wavefroms in the system of FIGURES 7 and 8. The lines of FIGURE 10 and corresponding locations in FIGURES 7 and 8 are designated by like lower case letters.

With reference first to subsystem 190, the oscillator contained in each of pickups 130a–130n comprises a series tuned RF transistor oscillator in which frequency of the output signal depends on the effective capacitance of the associated pickup. Since variation of the probe to rotor spacing causes variation of the pickup capacitance, the oscillator outputs will be frequency modulated as the rotor under inspection is rotated. In particular, the deviation of the modulated signal depends on the actual probe to surface distance while the rate of change of the oscillator frequency is related to the surface interruption rate, i.e., the product of the rotor r.p.m. and the number of rotor blades.

Each of the pickup oscillators is capacitively coupled to one of the movable arms 224a–224n of a respective level 226a–226n of stepping switch 194. The stationary contacts of levels 226a–226n of switch 194 are wired as follows:

For level 226a, the first stationary contact 228 is connected by means of a lead 230a to a common terminal point 232. All of the remaining stationary contacts 228b–228n are connected in common to a ground point 234.

The second level of switch 194 (not shown) is wired similarly to level 226a except that the second stationary contact is connected to common terminal point 232 and all of the remaining contacts, including the first, are connected in common to ground point 234. Each of stages 226c–226n is wired in a similar fashion, with a single stationary contact connected to ground point 234. Thus, for the 14th stage, 226n, the first through 13th stationary contacts, 236a–236m, are connected in common to ground point 234 while the 14th terminal 236n is connected by a lead 230n to common terminal point 232.

Switch 194 includes a conventional stepping solenoid 237 mechanically coupled to step the switch arms 224a–224n around the stationary contacts of the respective switch levels 226a–226n. Solenoid 237 is actuated by a signal over lead 238 from a stage selection switch 239 on the electronic console (see FIGURE 8). Switch 239 is a simple push button whereby successive depressions thereof result in the cycling of the stepping switch 194 through all of its positions.

For each position of arms 224a–224n, one of the pickup oscillators is connected through an ungrounded stationary contact of its respective switch level to common terminal 232 while the remaining oscillators are grounded in common at 234. For example, in a switch position shown, only the oscillator of pickup 130a is connected to common point 232, i.e., through arm 224a, stationary contact 228a and lead 230. Advancement of arms 224a–224n to the next position causes the grounding of the oscillator for pickup 130a and the connection of the oscillator for the second pickup (130b, not shown) to terminal point 232.

The grounding of a pickup oscillator output so overloads the circuit that it ceases to oscillate. This is quite desirable since simultaneous operation of 14 independent RF oscillators may give rise to interference beat components. On the other hand, nonoscillating circuits are maintained in a standby condition when grounded so that the circuit will rapidly return to its proper frequency of oscillation when the overload is removed. As may be understood, the above-described circuit configuration permits the independent inspection of a single rotor stage and convenient advancement of the inspection in sequence from one stage to the next.

Common terminal point 232 provides the signal input for FM demodulator 196. Demodulator 196 is of generally conventional construction and includes a crystal controlled intermediate frequency oscillator, a frequency converter, suitable intermediate frequency amplifiers, and a discriminator circuit having extremely high linearity over the entire expected deviation range. As will be understood, the demodulator output is a pulsating signal in which the amplitude is related to the capacitance resulting from passage of the rotor stage in front of the pickup. In other words, the amplitude of the signal is a direct representation of the surface profile of the rotor stage.

The capacitor-modulator-demodulator combination described is the preferred embodiment of the transducer portion of the system for several reasons. First, if the pickup is designed in accordance with certain criteria set forth below, the configuration shown provdies a highly sensitive pickup. However, since the frequency modulated oscillator outputs are of radio frequency (for example, having a 5 mHz. center frequency), and are consequently highly subject to noise degradation, the oscillator outputs are preferably transformed into lower frequency signals for further processing. Moreover, since the visual surface profile display is in terms of blade amplitude pulses, conversion of the frequency modulation analog signal to a variable amplitude analog signal is ultimately necessary. These functions are most conveniently performed by the use of FM demodulator 196 as shown. A typical output waveform for demodulator 196 is shown in line $a$ of FIGURE 10.

The output of FM demodulator 196 is provided over lead 240 to an automatic frequency control feedback network 198, which operates in conventional fashion to maintain accurate control of the center frequency of the pickup oscillators. The output of AFC circuit 198 is connected to a movable arm 242 of a 15th level 244 of stepping switch 194. The stationary contacts 246a–246n of level 244 are connected to a respective one of pickups 130a–130n to provide the frequency control signal to the pickup oscillators.

Stepping switch 194 also includes a 16th level 247. A positive voltage source 248 is connected to movable arm 249 of switch level 247, while the stationary contacts 250a–250n are connected to separate energizing leads 252a–252n, respectively, for the individual indicators comprising the stage indicator display 136 shown in FIGURE 8. Thus, the passage of movable arm 249 over contacts 250a through 250n causes illumination of each of the stage indicators in turn to provide a visual identification of the particular rotor stage being inspected.

The sensitivity and baseline adjustment circuit 200, shown in FIGURE 7, provides a separate gain control for each pickup and cooperates with blade profile extractor circuitry 202 to establish a fixed baseline for CRT display 132 for all rotor stages.

Inclusion of sensitivity and baseline adjustment generally, and in particular, of a separate adjustment for each rotor stage is desirable, since the demodulator output shown in line a of FIGURE 10 is characterized by a variation in both the maximum and minimum amplitudes of the signal pulsations. As previously explained, this results from the variation of both the blade and rotor drum profiles around the periphery of each stage and from stage-to-stage variation in the nominal radius of both the blades and the rotor drum.

Convenient and accurate visual analysis of the multistage rotor requires both a fixed baseline and a constant vertical scale factor for the CRT display. Separate sensitivity and bias adjustments for each stage is the most convenient means for achieving the desired control of the CRT display.

The circuitry itself comprises a series of 14 relays 254a–254n, and two sets of potentiometers 256a–256n, and 258a–258n. Each of the relays 254a–254n includes coil means 260a–260n and a pair of normally open contact pairs 262a–262n and 264a–264n respectively. One end of each of coils 260a–260n is connected in common to ground while the other end is connected to a respective one of leads 252a–252n and an individual coil is actuated in accordance with the location of moving contact 249 relative to stationary contacts 250a–250n of level 247 of switch 194. Thus, in the position shown, with contact 250a connected through arm 249 to voltage source 248, coil 260a is energized causing contact pairs 262a and 264a of relay 254a to be picked up.

One of the contacts in each of contact pairs 262a–262n is connected in common over a lead 266 to electronic subsystem 192 (see FIGURE 8), while the other contacts are individually connected to a respective one of arms 268a–268n of potentiometer 256a–256n. Similarly, one of the contacts in each of contact pairs 264a–264n is connected in common over a lead 270 to electronic subsystem 192, while the other contact is connected to a respective one of arms 272a–272n of potentiometers 258a–258n.

One end of each of potentiometers 256a–256n is connected to the output of FM demodulator circuit 196, while the opposite ends are commonly grounded at 274. Similarly, one end of each of potentiometers 258a–258n is connected in common through a suitable divider resistor 276 to a negative voltage source 278, while the opposite ends are commonly grounded, again at 274.

Thus, in accordance with the position of stepping switch 194, a succession of signal paths are created between FM demodulator circuit 196 and lead 266 on the one hand and between the negative power source 278 and lead 270 on the other hand. For example, with stepping switch 194 in the position shown, signal paths exist from arm 268a of potentiometer 256a through relay contact pair 262a to lead 266, and from negative power source 278 through resistor 276, arm 272a of potentiometer 258a, and through relay contact pair 264a to lead 270. As stepping switch 194 is cycled through its fourteen positions, each of relays 254a–254n is energized in succession which permits independent adjustment of the signals appearing on leads 266 and 270 for each stage of the rotor being inspected.

With reference now to electronic subsystem 192, blade profile extractor 202 comprises a preamplifier circuit 282, a filter circuit 283 comprising a capacitor 284 and a resistor 286, a diode 288, and a post-amplifying circuit 290. The signal input for profile extractor circuit 202 is provided over lead 266 while a base line level control input is provided over lead 270. The information signal is amplified by preamplifier 282 and then passed through filter 283 to the input 292 of post-amplifying circuit 290.

The circuit parameters for filter 283 are selected to emphasize the components of the $V_{s'}$ signal representing the blade profile of the rotor under inspection. While the exact values of capacitor 284 and resistor 286 may be subject to variation, most satisfactory operation is found to result if the product of the resistance and the capacitance, i.e., the circuit integration constant, is approximately equal to the inverse of the blade passage frequency.

Diode 288 serves to control the minimum level of the signal appearing at amplifier input 292. As shown in FIGURE 7, the lead 270 is connected through one of contact pairs 264a–264n to a negative potential at 278. Thus, a negative potential is applied to the anode of diode 288, the value of which depends on which of relay coils 268a–268n is energized. As long as the signal appearing at terminal 292 is more positive when the negative bias established on lead 270, diode 288 is reverse biased and remains nonconducting. On the other hand, should the filter output attempt to fall below the bias level on lead 270, diode 288 will become forward biased, then establishing a minimum value (i.e., the bias level on lead 270) below which the blade profile signal cannot fall. This level is, of course, individually adjusted for each rotor stage by potentiometers 258a–258n so that a constant minimum value for display base line is present for all rotor stages. The operation of a profile extractor circuit 202 may best be understood from line b of FIGURE 10 which shows the signal at terminal 292 resulting from a signal on lead 266 such as shown in FIGURE 10, line a.

The output of amplifier 290 is connected over lead 294 to the input of conventional vertical axis amplifier circuitry for CRT display 132, and also by means of lead 298 as the input to blade radius averager 220. Averager 220 comprises an average detector circuit 302, and a suitable display device such as meter 304. The average detector 302 operates to provide a measure of the average radius of the rotor blade profile. As previously mentioned, an average over approximately ten rotations produces satisfactory results whereby the integration constant of circuit 302 is preferably about 10 times that of filter 283 in blade radius extractor 202.

The horizontal sweep for CRT display 132 is generated by reference mark sensor 138, synchronization and reference signal generator 204, and sweep generator 210. As previously explained, reference mark sensor 138 produces a periodic pulse train at the primary rotation frequency of the rotor and with fixed phase determined by the position of marker ring 142 shown in FIGURE 4. The output of mark sensor 138 is shown at line c of FIGURE 10 for the revolutions of the rotor with signals beginning at times $t_1$, $t_2$, $t_3$. While the waveform shown in FIGURE 10 is only generally representative, the marker output is characterized by a rather broad pulse having poorly defined leading and trailing edges. To overcome this, and to provide sharply defined pulses for accurate triggering of subsequent portions of the system, the output of mark sensor 138 is provided from subsystem 190 to subsystem 192 over lead 280 and is passed through waveforming circuit 206. This circuit operates in conventional fashion to regenerate the mark sensor output and to produce a train of sharply defined pulses such as shown in line d of FIGURE 10. The output of waveform 206 is connected through a conventional pulse amplifying circuit 208 to establish the desired amplitude for the triggering pulses appearing on lead 306.

One of the functions of the output of trigger pulses on lead 306 is to provide synchronzation of the horizontal sweep for CRT display 132. This is accomplished by connecting the output of amplifier 208 over lead 306 as a frequency control input for sweep saw tooth generator 210.

Saw tooth generator 210 comprises a ramp generator 308 and amplitude control feedback network 310 including an average detector 312 and suitable amplifiers 314 and 316 to control signal levels in the circuit. Ramp generator 308 comprises a variable slope integrating circuit. In a preferred embodiment, a unijunction transistor, operating in the avalanche mode, serves as the active circuit element, although any equivalent means for generating a linear ramp waveform may be employed. In any event, the circuit is so designed that the output can be clamped to zero, or some other predetermined low level by the trigger signal on lead 306. Thus, the natural linear build-up of the output of ramp circuit 308 is periodically arrested to produce the saw tooth waveform shown in line e of FIGURE 10 on lead 318.

Ramp generator 308 includes means for controlling the slope of the output waveform. This is achieved by controlling the conductivity of the unijunction transistor or other active element in the circuit to determine the rate of signal buildup. Slope conrol is necessary since a fixed slope would result in variation of the maximum saw tooth level in accordance with the trigger signal frequency. (In other words, for a fixed linear slope, the maximum saw tooth level would be directly proportional to the time between trigger pulses). Correspondingly, the span of the horizontal sweep of display 132 would vary in accordance with the rotation speed of the rotor being inspected with possible loss of resolution or of a portion of the display. Such sweep variation is overcome by the employment of the amplitude control feedback circuit 310 including average detector 312 and amplifier 316. Average detector 312 provides a D.C. output, the level of which is correlated with the level of the sweep saw tooth on lead 318. The detector output is connected through amplifier 288 as a control input to the unijunction transistor circuit in ramp generator 308 to set the rate of current buildup in the transistor.

Should the maximum value of the sweep signal on lead 318 be insufficient to provide a complete horizontal trace between successive trigger pulses, the control signal from amplifier 316 causes more rapid current buildup through the unijunction transistor. This results in an increased maximum level for output of ramp generator 308. On the other hand, should the slope of the ramp generator output be too great, resulting in an excessively rapid buildup of the sweep saw tooth, the control signal from amplifier 316 reduces the unijunction transistor current buildup rate, with corresponding reduced maximum saw tooth level. For proper adjustment of average detector 312 and amplifier 316, the slope is continuously adjusted to maintain the maximum level of the saw tooth on lead 318 constant, independent of the trigger pulse frequency. Thus, optimum horizontal sweep is provided independent of the rotor r.p.m. As will be appreciated, it may be desirable, under certain conditions, to magnify a portion of the CRT display to permit viewing in detail of a portion of the rotor profile. This may readily be achieved by a sweep magnification circuit 320 connected in lead 318, which operates in a conventional manner to permit local expansion of the CRT display.

Cooperating with sweep saw tooth generator 210 and synchronization and reference signal generator 204 are the display intensifier signal generator 212, and the blade identifier including control logic 214, counter 216, and indicator 218. Disply intensifier signal generator 212 comprises an intensification position selector 324, connected as a first input to a cross over detector 326, and a brightening pulse generator 327 connected to the cross over detector output. A second input to cross over detector 326 is provided over lead 329 from the sweep saw tooth generator output on lead 318. Position selector 324 provides adjustable D.C. reference levels such as shown in line f of FIGURE 10 for comparison with the varying sweep saw tooth shown at line e of FIGURE 10. When the signal levels coincide, the cross over detector 326, which may comprise a Schmitt trigger or the like, provides an output in the form of a level transition such as shown at line g of FIGURE 11. Brightening pulse generator 327 responds to the level transition to produce a pulse output such as shown in line h of FIGURE 10. The brightening pulse is provided over lead 328 as an input to the Z axis driver circuit 330 of CRT 132. A second input having a polarity opposite to the brightening pulse is provided to Z axis driver circuit 330 over lead 332 and 334 from output 306 of synchronization and reference signal generator 204. This signal serves as a blanking pulse for the display during the CRT sweep retrace. The combined output signal from intensity modulation driver 330 is shown at line i of FIGURE 10, the brightening pulses shown as positive going and the blanking pulses as negative going.

Brightening pulse generator 327 is adjusted to provide an extremely narrow output, preferably of shorter duration than the individual display pulses corresponding to the rotor blades. This assures high resolution in selection of the desired portion of the display to be brightened.

In addition to its above described function, the brightening pulse signal on lead 328 also serves as a control input for logic circuitry 214 which controls the operation of blade identification counter 216. This permits automatic determination of the number of blades pulses appearing on CRT 132 between the beginning of each rotor cycle and the brightened pulse in the display.

Logic 214 comprises two coincidence circuits 338 and 340 and two flip flops 342 and 344. A push button switch 346 provides a start input for the counter logic over lead 348 while an additional push button switch 350 provides a reset signal over lead 352.

A reset signal on lead 352 establishes flip flop 342 in its ONE state. This produces a high level signal on lead 352 to condition coincidence gate 338. A second input to coincidence gate 338 is provided by the count signal on lead 348, while a final input is provided over lead 332 from the output of synchronization and reference signal generator 204.

Coincidence circuit 338 is connected by lead 356 to the SET input of flip flop 344 whereby a coincidence condition causes the flip flop to be switched into its ONE state. This produces a high signal level on output lead 358 which signal serves as a conditioning input for coincidence gate 340. A second input to coincidence gate 340 is provided over lead 360 from the output of amplifier 290 in blade profile extraction circuit 202. The output of coincidence gate 340 is connected over lead 362 as a counting input to blade identification counter 216, which comprises digital counting circuitry of any conventional or desired type. A visual output for blade identification counter 216 is provided by a blade count indicator 218. Both counter 216 and indicator 218 include reset inputs supplied over lead 364 from reset push button switch 350. The operation of blade identification counter 216, associated control logic 214 and display intensifier 212 is as follows:

Position selector 324 is manually adjusted until the desired portion of the CRT display is intensified. This established a precise time relationship between the output of the synchronization and reference signal generator 204 and the brightening signal output of cross over detector 326, shown as $T_M$ in line i of FIGURE 10. This time relationship is employed to control the operative period for coincidence gate 340 during which blade pulses appearing on lead 360 pass over lead 362 and are registered in blade pulse counter 216.

Counter operation is initiated by the depression of the reset switch 350 to establish counter 216, and indicator 218, in a zero count condition, and flip flop 342 in a ONE condition with a high level on output lead 354. This provides a first conditioning input for coincidence gate 338. With count switch 346 depressed, a second conditioning signal for coincidence gate 338 is provided over lead 348. Under these conditions, the arrival of a triggering signal on lead 332 will render coincidence gate 338 conductive producing a momentary high level on lead 356. This sets flip flop 344 in the ONE state which provides the conditioning signal on lead 358 for coincidence gate 340, permitting blade radius pulses to pass from the output of amplifier 290 to counter 216.

When the sweep signal attains the level established by position selector 324, cross over detector 326 fires to produce the brightening pulse, on leads 328 and 336. As a result flip flop 344 is reset causing the high level on lead 358 to be removed and to appear instead on the complementary output lead 359. This signal, in turn, is connected through a suitable differentiating circuit to the RESET input of flip flop 342 to return the same to its ZERO condition with a low output level on lead 354. As a result, the conditioning signal for coincidence gate 338 is removed. This prevents successive trigger signals on lead 332 from returning flip flop 344 to its ONE state with consequent disturbance of the count stored in counter 216 and indicator 218. Until a further reset signal is provided by reset switch 350, followed by depression of count switch 346, no modification of the blade count can take place.

Of course, should the identity of a further blade be desired, position selector 324 is adjusted until the brightened portion of the display overlies the pulse of interest. Then, reset switch 350 and count switch 346 are depressed whereby the above described process is repeated and a new count displayed in indicator 218.

As previously mentioned, the sensitivity of pickups 130a–130n depends in part on the geometries of both the sensing elements and of the object under inspection. In fact, it has been found that certain geometrical constraints exist which significantly affect the operation of the present inspection system. Proper operation has been found to depend upon careful system design in the light of these constraints.

The foregoing may best be understood by consideration of FIGURE 11, which shows an enlarged view of pickup probe member 164 of FIGURE 6, and of the tips of two blades 26a and 26b under inspection. Among the pertinent geometrical parameters referred to above, are the diameter D of needle member 166, the thickness T, and width W of the blades 26a and 26b, the separation distance $S_p$ between the blade and the probe member 166, and the spacing $S_b$ between adjacent blades. Also, under certain circumstances, the actual blade radius R may also be pertinent. Complex interrelationships between these parameters will determine not only the effective sensitivity and resolution of the pickup but also the shape of the pickup output waveform. For example, in FIGURE 11, the capacitance between the rotor and the pickup will be affected not only by the individual blade 26a but also by the adjacent blades in the associated stage and by the entire rotor structure as well. These effects are functionally related primarily to the interblade spacing $S_b$, the blade to pickup separation $S_p$, the probe diameter D, and the blade dimensions T. W. and R.

As will be appreciated, only limited design flexibility exists since the inspection system must be suited to the rotors being inspected. The rotor design obviously can not be made subject to modification simply to meet the exigencies of convenient inspection. Thus, as a practical matter, it has been found that the inspection system must be capable of considerable adaptation if it is to be usable for inspection of rotor structures of diverse design.

Fortunately, certain inherent features of rotors generally, e.g., $S_b$ and $W \gg T$, limit the number of parameters which must be adjusted in adapting the system to different rotor designs. Thus, for present and contemplated rotor designs, certain relationships set forth hereinafter between $S_p$, T, and D are most critical. Adaptation of the system to compensate for other rotor and system parameters is best accomplished by utilization of a production piece reference analog described below in connection with FIGURES 12 and 13.

In particular, it has been found that the ratio between the probe diameter D and the blade thickness T should be as small as possible so that the pickup signal is in the form of a series of flat topped pulses with sharply defined leading and trailing edges. For $D/T$ greater than about 1.0, differentiation between successive pulses is quite small whereby a system characterized by greater ratio does not possess sufficient sensitivity for satisfactory operation. Actually, a ratio of $D/T$ of about 0.5 or less is preferred for high accuracy inspection.

Thus, for a rotor blade 26 having a thickness of approximately 40 mils, system operation is feasible for a probe tip diameter up to about 40 mils but most successful operation is achieved for a probe tip diameter of approximately 20 mils or less.

On the other hand, practical difficulties are encountered in use of probes having a diameter substantially smaller than about 20 mils. Extremely slender probes, e.g., $D=10$ mils or less have been employed but have proved to be exceedingly fragile. In practice probes of a diameter between about 10 and 20 mils give excellent results.

Due to the inherent sensitivity limitations, it is found that the probe spacing $S_p$ should preferably be quite small to achieve a satisfactory signal-to-noise ratio in the measurement circuits. While the pickup described above exhibits usable sensitivity at distances of approximately 1 inch, it is found that best operation is achieved for a separation distance $S_p$ approximately equal to the probe diameter D or less. Optimum operation appears to result for a separation distance $S_p$ not exceeding about 60% of the probe diameter D. Thus, for a blade thickness of approximately 40 mils, and a corresponding probe diameter of about 20 mils, a separation distance of between about 20 and 10 or 12 mils, is preferred.

On the other hand, due to the nonlinear nature of the pickup, the sensitivity is extremely high for very small separation distances, which imposes excessive demands on the dynamic range of the measuring circuitry. Moreover, air currents generated by the moving blades may cause deflection of the probe tip for extremely small spacing. In addition, for extremely small spacing, there exists the danger of contact between an excessively oversized blade and the probe tip. In practice, a standoff distance of approximately 10–12 mils is satisfactory.

As previously pointed out, an accurate portrayal of the blade radius profile results in a pickup output in the form of a series of flat-topped extremely sharp-sided pulses. On the other hand, accurate transmission and processing of such flat-topped pulses requires considerable bandwidth in the electronic circuitry with resulting degradation of the signal-to-noise ratio of the measurement. For this reason, a trade-off between high signal-to-noise ratio and wide bandwidth is desirable. Fortunately, it has been found that a signal bandwidth equal to approximately the maximum blade tip passage rate is sufficient to produce a reproducability and accuracy of the order of ±200 microinches as required.

Moreover, due to the inability to produce an infinitely small diameter probe, the output pulses are extremely steep sided or completely flat-topped, whereby, as a practical matter, it is not possible to achieve a truly accurate portrayal of the actual shape of the blade itself. Thus, the lack of sharpness at the edges of the display pulses due to limited system bandwidth is not a practical limitation on system accuracy or utility.

System design in accordance with the foregoing is preferred for satisfactory operation but considerable variation in system response due to variation in rotor composition and geometry is nevertheless encountered. However, it has been found that according to the present invention, such variation can largely be overcome by the preparation of a mechanical reference structure of precisely known and substantially invariable characteristics against which the object under inspection can be compared. Such a production piece reference analog for the inspection of a turbine or compressor rotor as described above, is shown in FIGURES 12 and 13.

The reference analog, shown generally at 370, comprises a cylindrical member 372 including a series of disc-like sections 374a–374n equal in number to the number of stages in the production rotors to be inspected. The diameter and thickness of each of discs 374a–374n is exactly equal to the corresponding design center dimensions of the drums of the respective rotor stages. Discs 374a–374n are prepared with great care to minimize runout or other dimensional variations. Discs 374a–374n are axially mounted on a retaining shaft 376 by which reference analog 370 is rotated as explained below.

Each of discs 374a–374n is fitted with a series of blade analogs rigidly secured to and extending radially outward from the disc surface. One such series of blade analogs is shown at 378 in FIGURE 13a. As shown, blade analog 378 comprises four separate blades 380, 382, 384, and 386. Each of blades 380–386 is identical in width W and thickness T to the corresponding blades in the respective stage of the actual production rotor.

The relationship between the radii of blades 380–386 is shown in FIGURE 13b. The radius of blade 382 is exactly equal to the maximum radius $r_m$ acceptable for a production rotor blade under dynamic conditions, i.e., in the maximum root-seated blade position for an operating rotor. The radius of adjacent blade 384 is exactly equal to the nominal or design center blade radius $r_n$ again, under dynamic conditions. These blades are employed in setting the system sensitivity. The remaining two blades 380 and 386 are of an arbitrary radius $r_a$ intermediate the values of $r_n$ and $r_m$. It has been found that an excellent rotor analog is obtained with the relatively simple structure described above. For blade analog 370 only two dimension setting blades are necessary (i.e., blades 382 and 384). Though the actual dimensions are not critical, only two additional blades i.e., 380 and 386, are necessary to provide an accurate representation of gross structure of the rotor as long as each sensitivity setting blade is positioned intermediate two other blades. As will be appreciated, the sensitivity setting blades need not be adjacent as shown but may be separated by another blade of arbitrary radius. In that case, a total of five blades would be necessary.

Blades 380 and 386 need not be of equal radius nor even of radius intermediate $r_m$ and $r_n$. Any radius $r_a$ may be selected, though a value within the range of ordinarily encountered blade radii is preferred to maintain highest accuracy in simulation of the production rotor.

In addition to the foregoing, an analog reference mark pin 388 is secured to the end face 390 of disc 374n. As shown in FIGURE 13a, pin 388 is aligned with one of blades 380–386 so that the reference mark sensor will produce a pulse output in fixed relationship to the blade analogs 380–386.

System operation is explained in detail below. Briefly, however, reference analog 370 is installed in rotor cradle 104 and various adjustments are made so that the appearance of the nominal radius blade on the CRT display bears the desired relationship to that of the maximum oversized blade 382. Production rotors are then inserted in the test apparatus and compared against the preestablished reference dimensions of the production rotor analog. Recalibration may be effected at any desired interval simply by reinstalling the reference analog and checking the system response. Of course, inspection of rotors of diverse design may be easily accomplished by calibrating the system with the appropriate rotor analog prior to use.

System operation, including use of the above described reference analog is as follows:

After the system is placed in operation and given sufficient warm-up time to insure stable operation, a production rotor analog corresponding to the rotor to be inspected is mounted in rotor cradle 104 with drive belt 118 engaging one end of shaft 376 (see FIGURE 3).

With rotor analog 370 so mounted, each of the individual pickups 130a–130n in transducer assembly 128 is adjusted to the desired nominal standoff distance, e.g., about 12 mils, by loosening lock nut 176 and rotating threaded probe shank 186 until the proper standoff distance is achieved (see FIGURE 6). Measurement of the standoff distance can be accomplished in any convenient manner, for example, by use of a feeler gauge of the proper thickness. Once the proper position of probe 164 is achieved, lock nut 176 is tightened to retain the desired spacing. As will be appreciated, the actual degree of extension or retraction for each of the probes will depend on the particular stage of the rotor.

After adjustment of the probe-to-rotor blade spacing is completed, motor 116 is activated to rotate the production rotor analog with respect to pickups 130a–130n. The rotor stage selector switch 194 may be in any of its 14 positions at this time; however, for convenience, let it be assumed that the switch is in the position shown in FIGURE 7 with the rotating arms 224a–224n, 242, and 249 on the stationary contacts corresponding to the first rotor stage. Under these conditions, the stage indicator light 136 (FIGURE 8) corresponding to rotor stage 1 will be illuminated as a result of the positive voltage on lead 252a through contact 250a of switch level 247, movable contact arm 249, and positive voltage source 248. The voltage 252a energizes relay coil 260a (FIGURE 7) causing relay contacts 262a and 264a to be picked up.

At the same time, the output of pickup 130a is connected through movable contact 224a and fixed contact 228a of switch level 226a to FM demodulator 196. This produces a sequence of four pulses corresponding to analog blades 380–386. A frequency control signal produced by AFC circuit 198 is connected through movable arm 242 and fixed contact 246a of switch level 244 to the oscillator in pickup 130a. All of the remaining pickups 130b–130n are grounded through the first stationary contact of the respective switch level 226b–226n and are therefore in the previously described stand-by condition.

The demodulator output is adjusted by means of potentiometers 256a and 258a until the nominal blade pulse (corresponding to blade analog 384) and the oversized blade pulse (corresponding to blade analog 382) appear in proper amplitude relationship and vertical position on CRT 132.

Stage select switch 239 is now depressed, causing stepping switch 194 to be advanced to its second position. Probe 130a is thus placed in the stand-by condition and probe 130b is activated to produce a display of the second stage of rotor analog 370. An adjustment of potentiometers 256b and 258b (not shown) is made until the desired pulse amplitude difference and vertical position is achieved. Stage select switch 239 is again depressed and the identical adjustments made for each of the successive stages until sensitivity and base line adjustments have been made for all 14 rotor stages.

After calibration of all 14 pickups 130a–130n is completed, the sensitivity in all stages to a blade of nominal radius and to a blade of maximum acceptable excess radius is accurate, whereby like accuracy is achieved for blades of intermediate radius. (To facilitate "reading" of the CRT display, a ruled graticule having a non-linear scale corresponding to the non-linear pickup sensitivity may be provided for CRT 132.) Again, since the system sensitivity has been adjusted in each instance to provide proper response over a relatively wide range of blade radii, i.e., between nominal radius and maximum acceptable over sized radius, system response to blades of radii less than the desired nominal radius will be sufficiently accurate for satisfactory rotor inspection.

The apparatus is now prepared for the inspection of a production rotor. The rotor being inspected is installed in rotor cradle 104 and the ring 142 bearing reference marker pin 140 is mounted on the rotor shaft 114, in alignment with one of the blades on the adjacent rotor stage. This blade may be marked in any convenient fashion to facilitate later identification. Drive belt 118 is engaged with the end of the rotor shaft 114 and motor 116 started to rotate the rotor at a sufficient speed to seat the rotor blades. Stage select switch 239 is depressed to permit inspection of the first stage of the rotor whereby the entire blade profile for that stage is presented on CRT 132. As previously explained, each rotation of the rotor causes a synchronizing and reference pulse to be generated by reference mark sensor 138 and pulse generator 204, whereby accurate synchronization and optimum sweep time is insured independent of the rotor speed.

By visual observation of the display CRT 132, the existence of a blade sufficiently over or undersized to warrant replacement is noted. Position selector 324 (FIGURE 8) is adjusted as described above until the display pulse corresponding to the unsatisfactory blade is intensified. The operator then depresses reset switch 350 to establish blade count indicator 218 in its zero condition and to reset logic circuitry 214. Count switch 346 is then depressed whereby the next synchronization and reference trigger pulse appearing on lead 206 causes an automatic counting of the number of blade pulses between the first pulse appearing on CRT 132 and the brightened pulse. This number appears on blade count indicator 218 and may be recorded for future reference. Similarly, all remaining unsatisfactory blades in rotor stage 1 may be intensified and identified.

After complete inspection of the first rotor stage, stage select switch 239 is depressed and the above described process repeated for each rotor stage in succession. After complete inspection, the operator will have a list of blades warranting replacement which blades may be easily identified on the rotor by counting from the marked blade in each stage.

At any time, production rotor analog 370 may be reinstalled in the system and the calibration checked. Any necessary adjustments of potentiometers 256a–256n and 258a–258n may be made so that the production rotor analog display is returned to its correct form. As will be understood, this process is preferably repeated if a rotor of different design is to be inspected or at any other intervals at which calibration is considered to be necessary.

The above described system and inspection method are capable of rapid and convenient use with accuracy of ±.200 microinches as required in the production of modern high efficiency rotors for jet aircraft engines.

However, the principles of construction and operation described above are obviously susceptible of considerable modification and further automation if desired. For example, the system may be adapted to operate in a completely automated manner whereby sufficiently offsized blades are automatically sensed, e.g. by sequential comparison with a calibrated reference standard and the counting process automatically undertaken for any blades found to be unsatisfactory. The identities of any such blades relative to the preidentified marked blade may be printed out on a stage-by-stage basis without the necessity of operator intensification of unsatisfactory blades and initiation of the blade counting process followed by advancement of the system from stage to stage. Of course, any intermediate degree of system automation may also be achieved as will be understood by one skilled in the art in light of the above description.

In addition, measurement features other than those specifically described above, may readily be incorporated into the system. For example, runout information with respect to the blade crown can readily be obtained. Blade crown runout is obtained by the employment of a tuned filter adjusted to the primary rotation frequency of the rotor, and connected to the output of blade profile extractor circuit 202.

While the principles of the present invention are embodied in the above description in the form of an inspection system for a loose bladed structure in which relatively high speed rotation is necessary for proper seating of the individual blades, the concepts set forth herein are of considerably more general utility and are readily adapted for dynamic inspection of substantially any rotating interrupted surface. For example, the system may be readily adapted to the inspection and measurement of the outside diameter of splined surfaces, or, in the case of relatively shallow root designs, for the inspection and measurement of the root diameter as well. This permits checking of eccentricity of the root to crown circumference and, of course, is analogous to the rotor drum profile inspection mentioned above. The system is described as particularly suitable for the inspection of surfaces characterized by uniformly spaced surface interruptions; however, it may be readily adapted to the inspection of irregular surfaces as well.

The system may also be readily adapted for noncontact measurement of the runout of a machined surface, i.e., as in the case of the discs separating the individual stages of the above-described rotors. This permits determination of unbalance forces in the rotor by known techniques. Moreover, inspection of the interstage portions of the rotor assures sufficient clearance for the matching stator blade assembly when the engine is assembled. As will be appreciated, such measurement would require the inclusion in the system of appropriately placed pickups and attendant control and measurement circuitry.

With regard to the production piece reference analog, it will be understood that its exact nature will depend on the particular object being inspected but will always include sufficient surface interruption analogs to permit multiple point system calibration and to simulate the gross structure effects on each measurement of the remainder of the object under inspection.

Finally, within the scope of this invention, numerous structural and circuit modifications will be readily apparent to one skilled in the art. For example, use of the capacitive pickup described is preferred; however, substitution of any other energy sensitive pickup having the required resolution and sensitivity is also possible. Again, use of the FM translator system as described herein is preferred, but other equivalent translator systems compatible with the particular pickup arrangement employed may be substituted. Numerous other modifications within the scope of the invention are, of course, also possible.

What is desired to be secured by United States Letters Patent is:

1. Apparatus for inspecting a rotatable object characterized by a sequence of spaced surface interruptions of varying dimension comprising: a pickup adapted to be positioned in close proximity to but not in contact with said object; means for rotating said object to cause said surface interruptions to pass in succession through the field of sensitivity of said pickup, said pickup being sensitive to variations in energy existing in the space between said pickup and said object, said energy being subject to variation as a function of changes in the spacing between said pickup and the portion of said object within the pickup field of sensitivity, circuit means coupled to said pickup for producing an electrical output as a function of said energy variation in the form of a repeated sequence of pulses, said sequence of pulses constituting an electrical analog of the geometry of said sequence of surface interruptions; means for establishing calibrating signals corresponding to the energy levels for at least two predetermined values of spacing between said pickup and said object, and means coupled to said circuit means and responsive to said calibration signals for adjusting said circuit means to control the functional relationship between said electrical output and the corresponding energy level, thereby establishing a predetermined difference between the electrical outputs for said two different values of spacing.

2. An inspection system as defined in claim 1 where said pickup is characterized by a maximum dimension D parallel to the direction of rotation of said object, wherein said surface interruptions are characterized by a dimension T in the direction of rotation of said object, and by a dimension W transverse to said direction of rotation, and where the ratio of the dimensions D and T is less than approximately 1.0.

3. An inspection system as defined in claim 2 wherein said ratio of the dimensions D and T is less than approximately 0.5.

4. An inspection system as defined in claim 2 wherein said dimension D is between about 0.01 and 0.02 inch.

5. An inspection system as defined in claim 2 wherein said surface interruptions are characterized by a spacing $S_b$ in the direction of rotation of said object, wherein said dimension W and said spacing $S_b$ are both substantially greater than said dimension T of said surface interruptions and wherein said pickup is characterized by a dimension transverse to said direction of rotation which is relatively small compared to said dimension W of said surface interruptions.

6. An inspection system as defined in claim 1 wherein said pickup is characterized by a maximum dimension D parallel to the direction of rotation of said object, wherein said pickup and said interrupted surface are separated by an average distance $S_p$, and wherein said distance $S_p$ is less than or equal to said transverse dimension D.

7. An inspection system as defined in claim 6 wherein the ratio of said distance $S_p$ and said dimension D is less than or equal to about 0.6.

8. An inspection system as defined in claim 6 wherein said spacing $S_p$ is between about 0.01 and 0.02 inch.

9. An inspection system as defined in claim 1 wherein said object is formed of electrically conductive material, and wherein said pickup comprises an electrically conductive member disposed in spaced relation to said rotating object, and means electrically insulating said conducting member from said object whereby establishment of a potential difference between said object and said conductive member results in a current through the space therebetween characterized by a relationship in the form of:

$$I(t) = C \frac{dV(t)}{dt}$$

where $I(t)$ is the instantaneous value of the current, where $V(t)$ is the instantaneous value of the applied electric potential, and where C is inversely related to some function of the spacing between said conductive member and said object, said relationship applying for $V(t)$ characterized by a periodic time variation sufficiently low that the wavelength corresponding to said variation period is substantially larger than the spacing between said conductive member and said object.

10. An inspection system as defined in claim 9 including means for adjustably positioning said conductive member to vary the spacing thereof from said rotating object.

11. An inspection system as defined in claim 9 wherein said pickup includes a variable frequency oscillator, means including said conductive member connected to said oscillator for controlling the frequency thereof, and casing means for housing said conductive member, said oscillator, and said frequency determining means.

12. An inspection system as defined in claim 1 wherein said pickup means comprises means for generating a frequency modulated radio frequency signal characterized by a deviation which is a function of energy variations in the space between said pickup and said rotating object, and by a rate of deviation equal to the rate of passage of said surface interruptions through the field of sensitivity of said pickup, and wherein said circuit means includes means for converting said frequency modulated signal into said pulsating electrical output, the pulse height thereof being a function of said deviation, and the pulse frequency thereof being equal to said deviation rate.

13. An inspection system as defined in claim 1 wherein said means for establishing calibration signals comprises a mechanical analog of said object to be inspected, said analog being adapted to be substituted for said object in operative relationship to said pickup means, said analog comprising a first surface interruption analog having a predetermined radial dimension, at least a second surface interruption analog having a second predetermined radial dimension, and further means for simulating the gross effects of the structure of the object to be inspected apart from said first and second surface interruption analogs.

14. An inspection system as defined in claim 13 wherein said further means comprises at least third and fourth additional surface interruption analogs.

15. An inspection system as defined in claim 14 wherein said first and second surface interruption analogs are so disposed that passage thereof through the field of sensitivity of said pickup is both preceded and followed by the passage through said field of sensitivity of at least one other surface interruption analog, the spacing of all of said analogs being identical to the spacing of the surface interruptions on the object actually to be inspected.

16. An inspection system as defined in claim 13 wherein said means coupled to said circuit means and responsive to said reference signals comprises means for adjusting the amplitude difference between the pulses of said electrical output signal corresponding to said first and second surface interruption analogs when said mechanical analog is substituted for said object to be inspected, thereby to establish the desired functional relationship between said energy variations and said electrical output, and means for establishing a fixed minimum value for said electrical output signal independent of said adjusted functional relationship.

17. An inspection system as defined in claim 1 further including utilization circuitry for said electrical output signal comprising: display means for presenting a visual representaton of the entire sequence of pulses corresponding to one revolution of said object, and for maintaining said representation static as said object rotates, synchronization means cooperating with said object to establish a particular surface interruption thereof as corresponding to the initial pulse in said visual representation, identifying means cooperating with said display means for selecting one of the pulses and for identifying said selected pulse in said visual representation, and means for automatically counting the number of pulses between said established initial pulse and said selected pulse.

18. An inspection system as defined in claim 17 wherein said display means comprises: a cathode ray tube having vertical and horizontal deflection means, means coupling said electrical output to said vertical deflection means, sweep signal generating means coupled to said horizontal deflection means, and means including said synchronizing means for triggering said sweep signal generating means for each revolution of said object.

19. An inspection system as defined in claim 18 including means for adjusting the time rate of change of said sweep signal to provide a predetermined horizontal deflection for said cathode ray tube independent of the speed of rotation of said object.

20. An inspection system as defined in claim 18 wherein said identification means comprises means for comparing said sweep signal with an adjustable reference level and for providing a brightening signal when said sweep signal reaches said reference level, and means responsive to said brightening signal for intensity modulating said cathode ray tube display for a short period following the commencement of said brightening signal.

21. An inspection system as defined in claim 20 where said identification means further comprises means for counting the number of pulses in said electrical output and for providing a visual indication of said count, and logic means coupled to said counting means, said logic means being responsive to an external starting signal to initiate the operation of said counting means upon the next triggering of said sweep signal, said logic means being responsive to the first brightening signal following said triggering of said sweep signal to maintain said count and the display thereof at the then current state, and being further responsive to an external reset signal to return said counter and said visual indication to a zero count.

22. An inspection system as defined in claim 21 wherein the logic means is further adapted to prevent operation of said counting means by a second triggering of said sweep signal until said counter has been externally reset.

23. Apparatus for inspecting a multi-stage rotor of a turbine engine or the like to provide a measure of the radius of the individual blades in each stage thereof comprising: means for supporting said rotor during inspection, means for rotating said rotor in said support means, transducer means including a plurality of pickups, one of said pickups being disposed in radial alignment with each stage of said rotor in close proximity to but not in contact with the tips of the rotor blades, whereby the blades in each rotor stage pass in succession into radial alignment with the associated one of said pickups when said rotor is rotated, said pickups being sensitive to variations of the radial distance between said pickup and the associated rotor stage, said transducer means further including translator circuit means cooperating with said pickups to produce an electrical output as a function of said radial distance, switching means for selectively coupling a single one of said pickups to said translator circuit means whereby said electrical output comprises a repeated sequence of pulsations, each pulsation corresponding to one of the blades in the rotor stage associated with said coupled pickup, calibration means for establishing reference signals corresponding to at least two predetermined values of spacing between each pickup and the associated rotor stage, and means coupled to said circuit means and responsive to said reference signals to adjust the functional relationship between said electrical output and said spacing for each pickup to establish a predetermined difference in the signal level of said electrical output for the respective two distances.

24. Inspection apparatus as defined in claim 23 wherein said calibrating means comprises a mechanical analog of the rotor actually being inspected, said analog being adapted to be substituted for said rotor and to be rotated in said support means in operative relationship to said transducer means, said analog comprising a stage analog for each stage of the rotor actually being inspected, each stage analog including a first blade analog having a predetermined radius, at least a second blade analog having a second predetermined radius, and further means for simulating the gross effects of the structure of the actual rotor apart from said first and said second blade analogs, the geometry of said mechanical analog being such as to closely simulate the actual rotor when said rotor is under inspection.

25. Inspection apparatus as defined in claim 24 wherein said further means comprises at least third and fourth additional blade analogs on each stage analog.

26. Inspection apparatus as defined in claim 25 wherein said first and second blade analogs in each stage analog are so disposed that said first and said second blade analogs are both preceded and followed into radial alignment with the associated pickup by at least one other blade analog, the spacing of all said blade analogs being substantially equal to the spacing of the blades on the rotor actually to be inspected.

27. Inspection apparatus as defined in claim 24 wherein said means coupled to said circuit means comprises means for separately adjusting the amplitude difference between the pulsations of said electrical output signal corresponding to said first and second blade analogs of each stage analog when said mechanical analog is substituted for said rotor to be inspected, thereby to establish the desired functional relationship between variations in blade radius and said electrical output for each stage, and means for establishing a fixed minimum value for said electrical output signal independent of said adjusted functional relationship.

28. Inspection apparatus as defined in claim 23 wherein each of said pickups includes a slender elongated sensing portion of dimension D parallel to the direction of rotation of said rotor, wherein said rotor blades are characterized by a dimension T in the direction of rotation, and where the ratio of the dimensions D and T is less than approximately 1.0.

29. Inspection apparatus as defined in claim 28 wherein said ratio of the dimensions D and T is less than approximately 0.5.

30. Inspection apparatus as defined in claim 28 wherein said dimension D is between about 0.01 and 0.02 inch.

31. Inspection apparatus as defined in claim 23 wherein each said pickup is characterized by a dimension D parallel to the direction of rotation of said rotor, wherein said pickup and said blade tips are separated by an average distance $S_p$, and wherein said distance $S_p$ is less than or equal to said dimension D.

32. Inspection apparatus as defined in claim 31 wherein the ratio of said distance $S_p$ and said dimension D is less than or equal to about 0.6.

33. Inspection apparatus as defined in claim 31 wherein said spacing $S_p$ is between about 0.01 and 0.02 inch.

34. Inspection apparatus as defined in claim 23 wherein said means coupled to said circuit means and responsive to said reference signals comprises sensitivity setting circuitry including means for individually adjusting the amplitude of the electrical output of said translator circuit for each of said pickups, base line setting circuitry including means for establishing individually adjustable biasing signals for each of said pickups, and blade profile extraction means having a signal input connected to the output of said sensitivity sensing circuitry, and a clamping level control input connected to the output of said base line setting circuitry, said extraction means being operative to establish a minimum value for the output of said sensitivity adjusting circuit in accordance with the output of said base line setting circuit.

35. Inspection apparatus as defined in claim 34 wherein said blade profile extraction means further includes filter means, said filter means having a time constant approximately equal to the inverse of the frequency at which said rotor blades are rotated past said pickups.

36. Inspection apparatus as defined in claim 23 further including utilization circuitry for said electrical output signal comprising: display means for presenting a visual representation of the sequence of pulsations corresponding to a particular stage of the rotor being inspected for one complete revolution thereof, synchronization means cooperating with said rotor to establish a particular axial rank of blades as corresponding to the initial pulsation in said visual representation, identifying means cooperating with said display means for selecting one of the pulsations and for identifying said selected pulsation in said visual respresentation and means for automatically counting the number of pulsations between said established initial pulsation and said selected pulsation thereby facilitating location of a particular blade with respect to said established axial rank of blades.

37. Inspection apparatus as defined in claim 36 wherein said synchronization means comprises reference marker means, means for positioning said reference marker in a fixed position relative to an axial rank of blades on said rotor, sensing means cooperating with said marker means, said marker means and said sensing means being so positioned relative to each other that the former passes in close proximity to the latter once for every revolution of said rotor.

38. Inspection apparatus as defined in claim 23 wherein each said pickup includes sensing means having a variable reactance which is a function of said radial distance, a variable frequency oscillator providing the output for said pickup, means including said sensing means connected to said oscillator for controlling the frequency thereof, and casing means for housing said sensing means, said oscillator, and said frequency determining means.

39. Inspection apparatus as defined in claim 38 where said switching means includes means for establishing the oscillators in said pickups in an operative but nonoscillating mode, and for permitting oscillation only when the associated pickup is coupled to said translator circuit means.

40. Inspection apparatus as defined in claim 39 where said means for establishing said oscillators in said nonoscillating mode comprises means for loading the output of said oscillator sufficiently to prevent oscillation.

41. Inspection apparatus as defined in claim 36 wherein said display means comprises: a cathode ray tube having vertical and horizontal deflection means, means coupling said electrical output to said vertical deflection means, sweep signal generating means coupled to said horizontal deflection means, and means including said synchronizing means for triggering said sweep signal generating means for each revolution of said rotor.

42. Inspection apparatus as defined in claim 41 including means for adjusting the time rate of change of said sweep signal to provide a predetermined horizontal deflection for said cathode ray tube independent of the speed of rotation of said rotor.

43. Inspection apparatus as defined in claim 41 wherein said identification means comprises means for comparing said sweep signal with an adjustable reference level and for providing a brightening signal when said sweep signal reaches said reference level, and means responsive to said brightening signal for intensity modulating said cathode ray tube display for a short period following the commencement of said brightening signal.

44. Inspection apparatus as defined in claim 43 where said counting means comprises means for counting the number of pulses in said electrical output and for providing a visual indication of said count, and logic means coupled to said counting means, said logic means being responsive to an external starting signal to initiate the operation of said counting means upon the triggering of said sweep signal, said logic means being responsive to the first brightening signal following said triggering of said sweep signal to maintain said count and the display thereof at the then current state, and being further responsive to an external reset signal to return said counter and said visual indication to a zero count.

45. Inspection apparatus as defined in claim 44 wherein the logic means is further adapted to prevent operation of said counting means by a second triggering of said sweep signal until said counter has been externally reset.

46. A noncontact measuring system for inspecting the blade radius profile of a rotor stage for a turbine engine or the like comprising: transducer means adapted to be positioned in close proximity to but not in contact with said rotor stage, means for rotating said rotor to cause the passage of said rotor blades through the field of sensitivity of said transducer means, said transducer means being sensitive to variations in energy existing in the space between said transducer means and said rotor, said energy being subjected to variation as a function of change in the spacing between said transducer means and said rotor, circuit means coupled to said transducer means to produce an electrical output as a function of said energy in the form of a repeated sequence of pulses, each pulse corresponding to one of said rotor blades and having an amplitude which is a function of the radius of said blade; display means for providing a visual representation of the sequence of pulsations for a complete rotation of said rotor; and display synchronizing means comprising reference means to establish one of the blades of said rotor stage as corresponding to the initial pulse in said sequence of pulses, and triggering means to reset said display means once for each rotation of said rotor stage to prepare said display means for the next sequence of pulses when said established blade is in a predetermined position.

47. Apparatus as defined in claim 46 wherein said reference means comprises a sensor fixed in space with said rotor being movable relative thereto, marker means on said rotor adapted to pass in proximity to said sensor briefly during each rotation of said rotor, said sensor providing a synchronizing signal to said triggering means in response to said passage of said marker means in proximity to said sensor.

48. Apparatus as defined in claim 47 wherein said marker means comprises a member adapted to be attached to said rotor in predetermined angular relation to one of said blades, said member being so positioned as to pass within the field of sensitivity of said sensor during each revolution of the rotor.

49. Apparatus as defined in claim 47 wherein said display means comprises: a cathode ray tube having vertical and horizontal deflection means, means coupling said electrical output to said vertical deflection means, sweep signal generating means coupled to said horizontal deflection means, said triggering means being operative to initiate said sweep signal generating means once for each revolution of said object.

50. Apparatus as defined in claim 49 including means for adjusting the time rate of change of said sweep signal to provide a predetermined horizontal deflection for said cathode ray tube independent of the speed of rotation of said object.

51. Apparatus as defined in claim 49 including identifying means cooperating with said display means for selecting one of the pulses and for identifying said selected pulse in said visual representation, said identification means comprising means for comparing said sweep signal with an adjustable reference level and for providing a brightening signal when said sweep signal reaches said reference level, and means responsive to said brightening signal for intensity modulating said cathode ray tube display for a short period following the commencement of said brightening signal.

52. Apparatus as defined in claim 51 wherein said identification means further comprises means for counting the number of pulses in said electrical output and for providing a visual indication of said count, and logic means coupled to said counting means, said logic means being responsive to an external starting signal to initiate the operation of said counting means upon the next triggering of said sweep signal, said logic means being responsive to the first brightening signal following said triggering of said sweep signal to maintain said count and the display thereof at the then current state, and being further responsive to an external reset signal to return said counter and said visual indication to a zero count.

53. Apparatus as defined in claim 52 wherein the logic means is further adapted to prevent operation of said counting means by a second triggering of said sweep signal until said counter has been externally reset.

54. Apparatus for inspecting the profile of a rotating object characterized by a sequence of spaced surface interruptions of varying dimension comprising: a pickup adapted to be positioned in close proximity to but not in contact with said object; said pickup being sensitive to variations in energy existing in the space between said pickup and said object, said energy being subject to variation as a function of changes in the spacing between said pickup and the portion of said object within the pickup field of sensitivity; said pickup and said object being so positioned relative to each other that rotation of said object causes said surface interruptions to pass in succession through the field of sensitivity of said pickup; circuit means coupled to said pickup for producing an electrical output as a function of said energy variation in the form of a repeated sequence of pulses, said sequence of pulses constituting an electrical analog of the geometry of said sequence of surface interruptions, display means for presenting a visual representation of the sequence of pulses for one complete revolution of said object; synchronization means cooperating with said object to establish a particular one of said surface interruptions as corresponding to the initial pulse in said visual representation and to provide a synchronizing signal once during each rotation of said object responsive to passage of said particular surface interruption through a fixed location in space.

55. Apparatus as defined in claim 54 further including: identifying means cooperating with said display means for selecting one of the pulses and for identifying said selected pulses in said visual representation; and counting means to determine the number of pulses between said established initial pulse and said selected pulse.

56. Apparatus as defined in claim 55 wherein said display means comprises: a cathode ray tube having vertical and horizontal deflection means, means coupling said electrical output to said vertical deflection means, sweep signal generating means coupled to said horizontal deflection means, said triggering means being operative to initiate said sweep signal generating means for each revolution of said object.

57. Apparatus as defined in claim 56 including means for adjusting the time rate of change of said sweep signal to provide a predetermined horizontal deflection for said cathode ray tube independent of the speed of rotation of said object.

58. Apparatus as defined in claim 56 wherein said identification means comprises means for comparing said sweep signal with an adjustable reference level and for providing a brightening signal when said sweep signal reaches said reference level, and means responsive to said brightening signal for intensity modulating said cathode ray tube display for a short period following the commencement of said brightening signal.

59. Apparatus as defined in claim 58 wherein said counting means comprises means for counting the number of pulses in said electrical output and for providing a visual indication of said count, and logic means coupled to said counting means, said logic means being responsive to an external starting signal to initiate the operation of said counting means upon the next triggering of said sweep signal, said logic means being responsive to the first brightening signal following said triggering of said sweep signal to maintain said count and the display thereof at the then current state, and being further responsive to an external reset signal to return said counter and said visual indication to a zero count.

60. Apparatus as defined in claim 59 wherein the logic means is further adapted to prevent operation of said counting means by a second triggering of said sweep signal until said counter has been externally reset.

References Cited

UNITED STATES PATENTS

| | | | |
|---|---|---|---|
| 2,842,738 | 7/1958 | Warnick | 324—61 |
| 3,386,031 | 5/1968 | Able et al. | 324—61 |

EDWARD E. KUBASIEWICZ, Primary Examiner

U.S. Cl. X.R.

73—465

PO-1050
(5/69)

UNITED STATES PATENT OFFICE
CERTIFICATE OF CORRECTION

Patent No. 3,504,279  Dated March 31, 1970

Inventor(s) GEORGE B. FOSTER and EUGENE R. LUCKA

It is certified that error appears in the above-identified patent and that said Letters Patent are hereby corrected as shown below:

Column 8, line 23, "$V_s$," should read -- $V'_s$ --. Column 9, line 70, "148-148n" should read -- 148a-148n --. Column 15, line 22, "conrol" should read -- control --. Column 27, line 70, "subjected" should read -- subject --.

SIGNED AND SEALED
SEP 15 1970

(SEAL)
Attest:

Edward M. Fletcher, Jr.
Attesting Officer

WILLIAM E. SCHUYLER, JR.
Commissioner of Patents